(12) United States Patent
Laubach

(10) Patent No.: US 8,495,997 B1
(45) Date of Patent: Jul. 30, 2013

(54) SOLAR PANEL CLIP AND METHOD FOR ATTACHING A SOLAR PANEL

(75) Inventor: Robert B. Laubach, San Jose, CA (US)

(73) Assignee: MBL & Sons, Inc., San Jose, CA (US)

( * ) Notice: Subject to any disclaimer, the term of this patent is extended or adjusted under 35 U.S.C. 154(b) by 440 days.

(21) Appl. No.: 12/730,652

(22) Filed: Mar. 24, 2010

Related U.S. Application Data

(60) Provisional application No. 61/168,488, filed on Apr. 10, 2009, provisional application No. 61/219,541, filed on Jun. 23, 2009.

(51) Int. Cl.
- *F24J 2/02* (2006.01)
- *F24J 2/46* (2006.01)
- *E04D 13/18* (2006.01)
- *H01L 31/042* (2006.01)
- *B42F 13/00* (2006.01)

(52) U.S. Cl.
USPC ........... 126/680; 126/621; 126/623; 136/244; 248/237; 52/173.3

(58) Field of Classification Search
USPC ........... 126/621, 623, 680; 136/244; 248/237; 52/173.3
See application file for complete search history.

(56) References Cited

U.S. PATENT DOCUMENTS

| | | | | |
|---|---|---|---|---|
| 1,826,133 A | * | 10/1931 | Hatch | 52/772 |
| 4,393,859 A | * | 7/1983 | Marossy et al. | 126/586 |
| 6,672,018 B2 | * | 1/2004 | Shingleton | 52/173.3 |
| 7,766,292 B2 | * | 8/2010 | Liebendorfer | 248/237 |
| 2004/0216399 A1 | * | 11/2004 | Yamada et al. | 52/173.1 |
| 2008/0053517 A1 | * | 3/2008 | Plaisted et al. | 136/251 |

* cited by examiner

*Primary Examiner* — Kenneth Rinehart
*Assistant Examiner* — William Corboy
(74) *Attorney, Agent, or Firm* — Womble Carlyle Sandridge & Rice, LLP

(57) ABSTRACT

An apparatus, system, and method for attaching a solar panel to a purlin is disclosed, the solar panel further including a frame having a set of frame holes. The apparatus includes a solar panel clip including a solar panel clip bearing surface, a key formed on the solar panel clip bearing surface, a perpendicular locking surface coupled to the solar panel clip bearing surface, and an upper solar panel spacing section configured to provide an expansion joint. The apparatus also may include a solar panel clip washer mount. A solar panel is positioned on the solar panel clip bearing surface and is secured to the purlin.

15 Claims, 22 Drawing Sheets

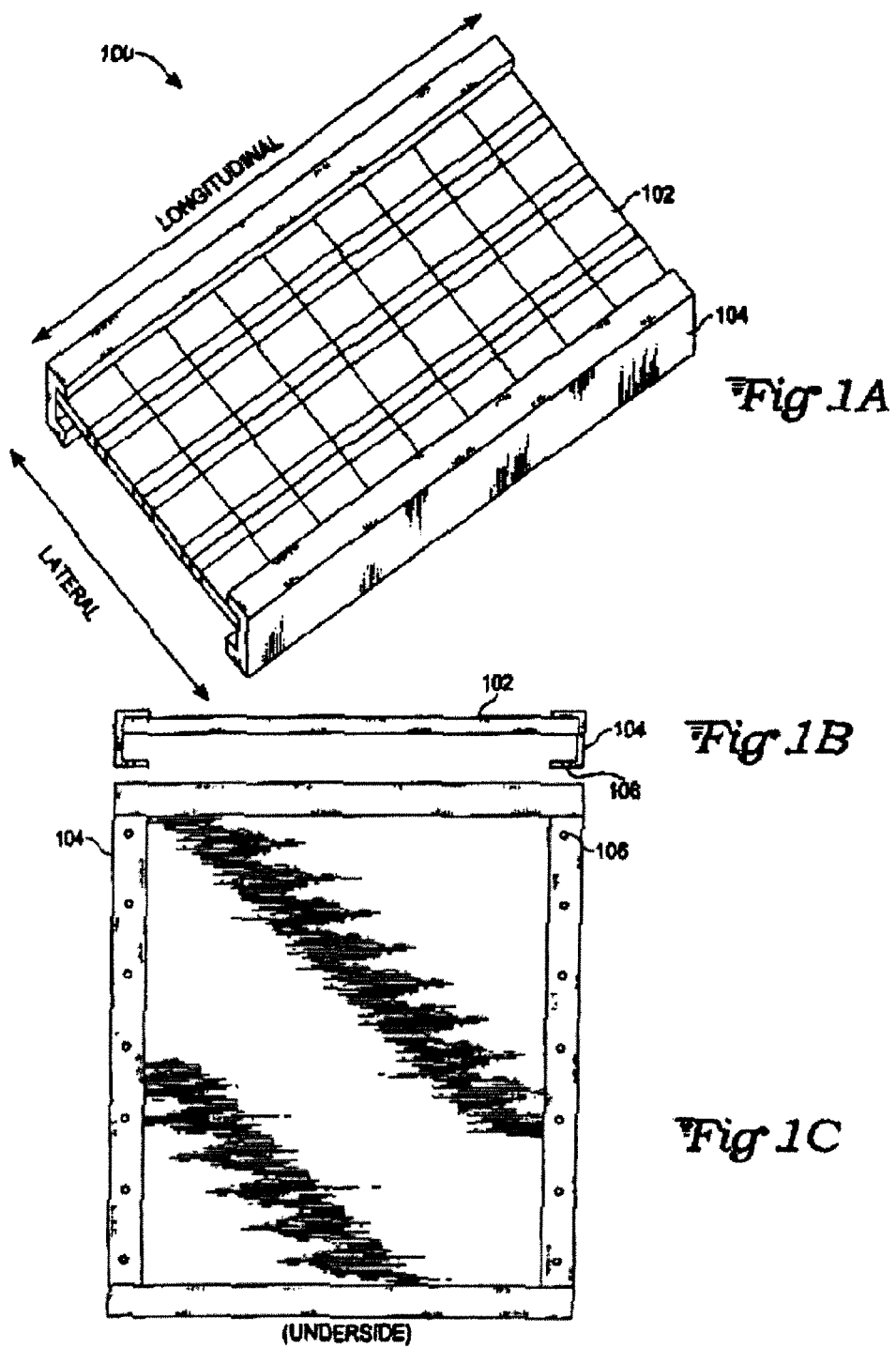

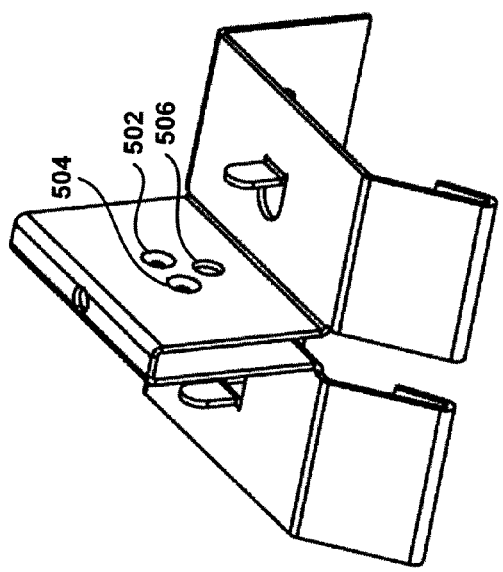
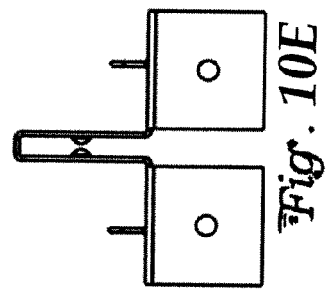
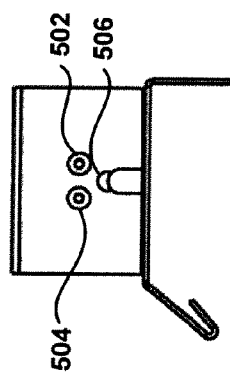
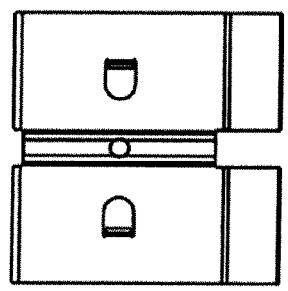
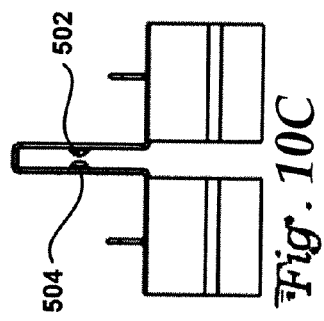

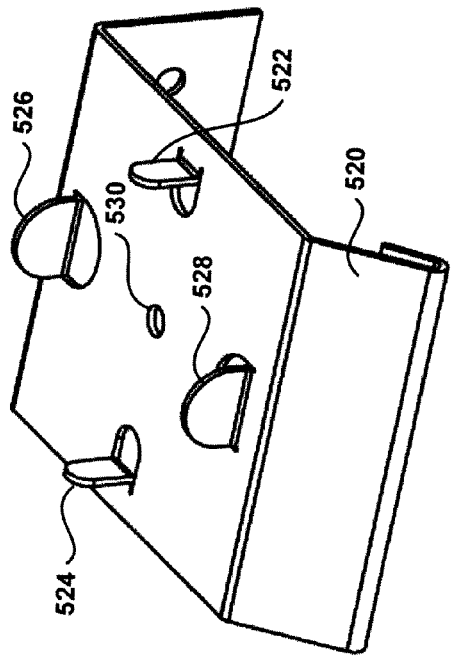
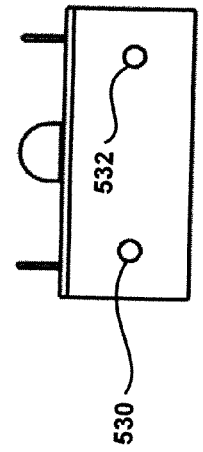
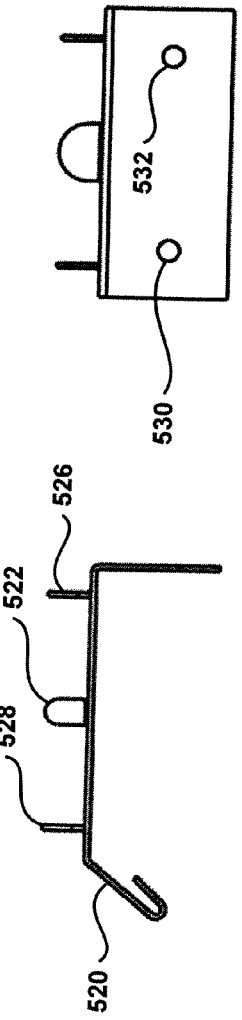
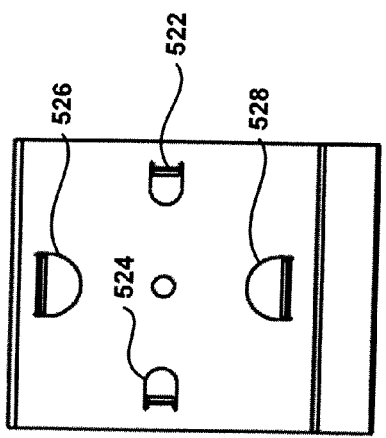
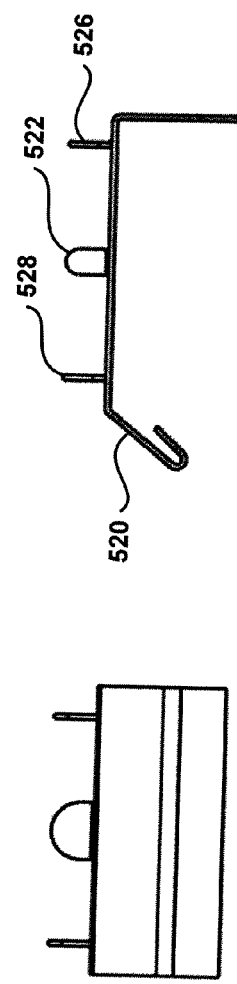

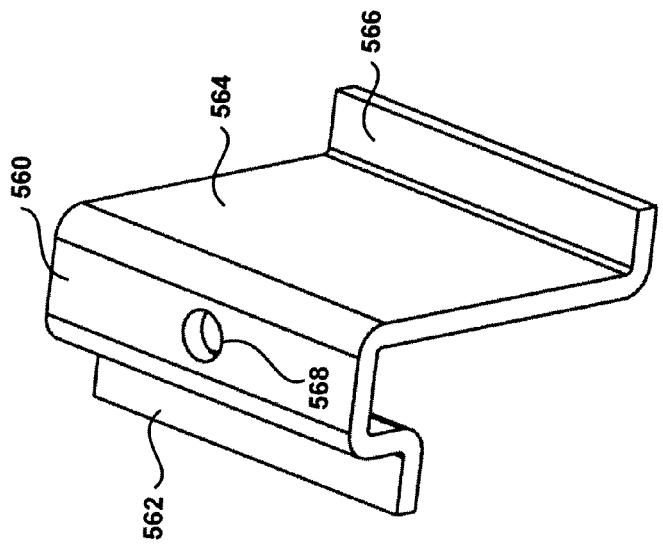
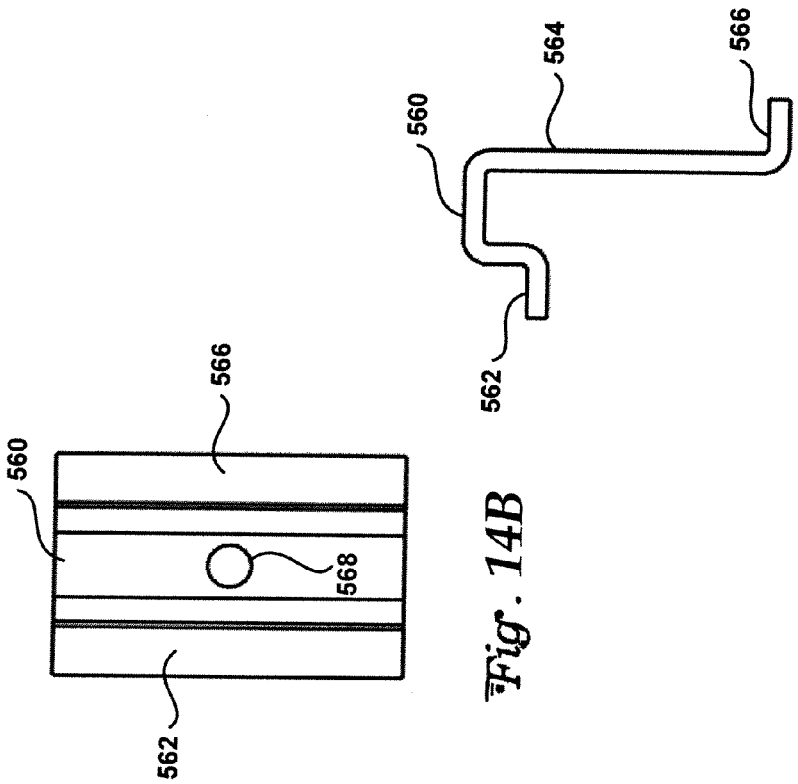

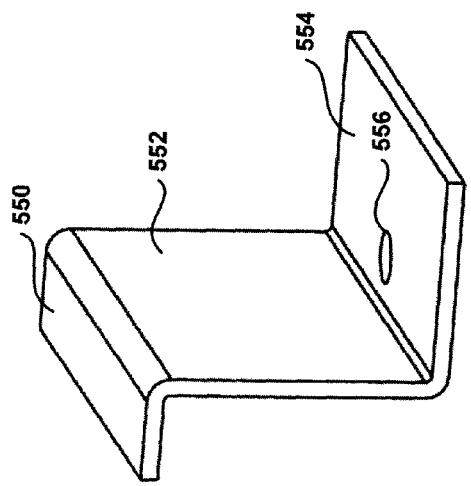
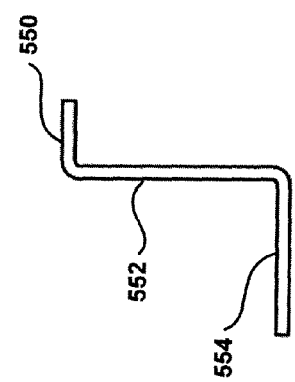
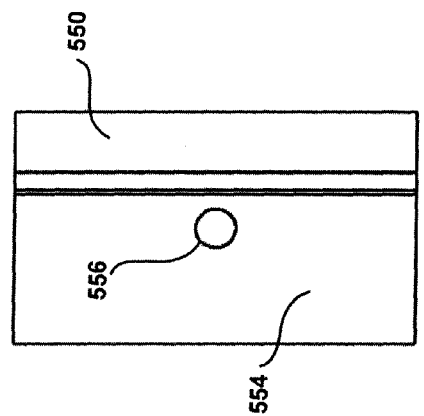

SOLAR PANEL CLIP AND METHOD FOR ATTACHING A SOLAR PANEL

CLAIM OF PRIORITY

This application claims priority from U.S. Provisional Patent Application No. 61/168,488, filed Apr. 10, 2009, and entitled "SOLAR PANEL CLIP AND METHOD FOR ATTACHING A SOLAR PANEL"; and U.S. Provisional Patent Application No. 61/219,541, filed Jun. 23, 2009, and entitled "SOLAR PANEL CLIP AND METHOD FOR ATTACHING A SOLAR PANEL", which are incorporated herein by reference.

BACKGROUND

The present invention generally relates to solar panel installation, and more particularly relates to methods, apparatus, and systems for attaching a solar panel to an attachment support structure.

A solar (or photovoltaic) panel generally converts sunlight into solar electricity. Usually comprised of a semiconductor material, such as silicon, photons in sunlight hit the solar panel and knock loose electrons from their atoms, allowing them to flow through the material to produce electricity.

Referring now to FIGS. 1A-C, a set of drawings of a simplified solar panel is shown. FIG. 1A shows an isometric view of the simplified solar panel. FIG. 1B shows a side view of the simplified solar panel. FIG. 1C shows and underside view of the simplified solar panel.

Typically a relatively fragile photovoltaic substrate 102 is attached to a frame 104 for structural strength and protection, as well as providing a mechanism for attaching solar panel 100 to an attachment support structure (described below). Frame 104 generally includes a plurality of frame holes 106 through which a solar panel fastener (e.g., nuts, bolts, screws, etc.) may be inserted in order to secure the solar panel.

Consequently, since solar panel output power is directly proportional to the amount of sunlight exposure as well as operating temperature (output may vary by 2.5% for every 5 degrees variation in temperature), it is critical that solar panels be positioned properly.

However, the installation of solar panels is generally inefficient and very labor intensive, often consuming over 66% of the total installation cost. For example, most typical configurations involve mounting a set of solar panels on an attachment support structure that, in turn, may be secured on a roof, ground, or similar structure. Similar in concept to a child's Erector Set® toy, an attachment support structure is generally configured as a set of metal beams with regular holes for nuts, bolts, screws, that is assembled into a series of horizontal, vertical, and diagonal members.

Referring now to FIG. 2A, a simplified side view diagram of an attachment support structure and solar panel is shown. Solar panel 100 is generally positioned from about 5° to about 25° toward the sun in order to maximize sunlight exposure. In a common configuration, lateral support members 110 are made from Unistrut® or other suitable framing support members. A set of solar panel fasteners are then inserted through frame holes (not shown) in order to secure solar panel 100 to attachment support structure frame 112.

Typically made out of tube steel, attachment support structure frame 112 is generally rectangular in shape and provides suitable sub-structure for the attachment of lateral support members. Attachment support structure frame 112 is in turn secured to a set of footings 124 on surface 126 (e.g., rooftop, ground, etc.) by a series of vertical support members 114a-b, diagonal support members 116a-b, and horizontal support member 122.

Referring to FIG. 2B, a simplified isometric diagram of a Unistrut framing support member is shown. Used extensively in industrial and commercial construction markets, Unistrut generally requires a spring nut and bolt (not shown) connected to continuous slotted channel 132 with a set of holes 134.

However, although versatile, the use of Unistrut tends to be relatively expensive to use, often over $1 per foot. In addition, installation is problematic since the solar panel frame is generally attached to the attachment support structure (as shown is FIG. 2A) via holes that are positioned underneath the photovoltaic substrate.

For example, a first worker would generally position a solar panel on the attachment support structure, while a second worker would climb into the relatively confined space underneath the attachment support structure. For each solar panel frame hole, both workers must generally reposition the solar panel such that a solar panel fastener may be inserted through both the solar panel frame hole and the corresponding Unistrut hole. In addition, after the solar panel fastener is inserted, it generally must be tightened from underneath the solar panel at the correct torque setting in order to properly secure the solar panel without damage.

Consequently, it would be beneficial to use an optimized clip in order to quickly attach a solar panel to a frame in a cost-effective manner. It is in this context that embodiments of the invention arise.

SUMMARY

The invention will be more completely understood by reference to the following detailed description.

In accordance with the present invention, an apparatus for attaching a solar panel to a purlin, the solar panel including a frame with a set of frame holes. In one example, the apparatus includes a solar panel clip including a solar panel clip bearing surface, a key formed on the solar panel clip bearing surface, a perpendicular locking surface coupled to the solar panel clip bearing surface, and an upper solar panel spacing section configured to provide and expansion joint. The apparatus has the same cross-sectional shape of the corresponding purlin and is slideable over the purlin. The apparatus may also include a solar panel clip washer. Wherein when a solar panel is positioned on the solar panel clip bearing surface, and a fastener is inserted through a solar panel clip fastener hole and solar panel washer hole, the solar panel is secured to the purlin.

In another embodiment, a support assembly includes a support, first and second saddle assemblies, and first and second support extensions. The first and second saddle assemblies are affixed to each other and surround the top portion of the support. The first and second support extensions have a top and a bottom, where the top of each support extension is affixed to a plate, and the bottom of each support extension is affixed to the first and second saddle assemblies. Additionally, the plate pivots around a pivot point defined through the first support extension.

It should be appreciated that the present invention can be implemented in numerous ways, such as a process, an apparatus, a system, or a device. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 1A shows an isometric view of the simplified solar panel.

FIG. 1B shows a side view of the simplified solar panel.

FIG. 1C shows and underside view of the simplified solar panel.

FIG. 10A shows an isometric view of a 'Z' solar panel clip with guide dimples, in accordance with the present invention.

FIG. 10B shows a top-down view of the solar panel clip of FIG. 10A.

FIG. 10C shows a front view of the 'Z' solar panel clip of FIG. 10A.

FIG. 10D shows a side view of the solar panel clip of FIG. 10A.

FIG. 10E shows a back view of the 'Z' solar panel clip of FIG. 10A.

FIG. 12A shows an isometric view of a zero-profile 'Z' solar panel clip, in accordance with the present invention.

FIG. 12B shows a top-down view of the solar panel clip of FIG. 12A.

FIG. 12C shows a front view of the 'Z' solar panel clip of FIG. 12A.

FIG. 12D shows a side view of the solar panel clip of FIG. 12A.

FIG. 12E shows a back view of the 'Z' solar panel clip of FIG. 11A.

FIG. 14A shows an isometric view of an end washer, in accordance with the present invention.

FIG. 14B shows a lateral side view of the solar panel clip washer of FIG. 14A.

FIG. 14C shows a top-down view of the solar panel clip washer of FIG. 14A.

FIG. 15A shows an isometric view of a zero-profile end washer, in accordance with the present invention.

FIG. 15B shows a lateral side view of the solar panel clip washer of FIG. 15A.

FIG. 15C shows a top-down view of the solar panel clip washer of FIG. 15A.

DETAILED DESCRIPTION

Figure 2A:
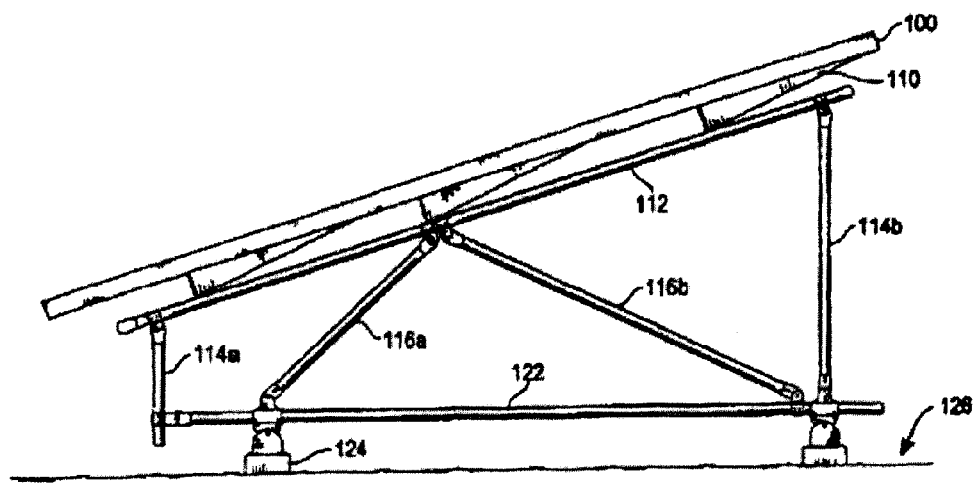
FIG. 2A shows a simplified side view diagram of an attachment support structure and solar panel.
Figure 2B:
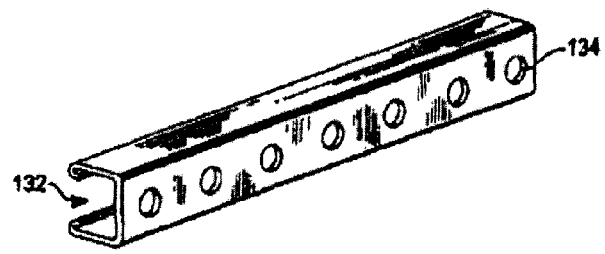
FIG. 2B shows a simplified isometric diagram of a Unistrut framing support member.
Figure 3A:
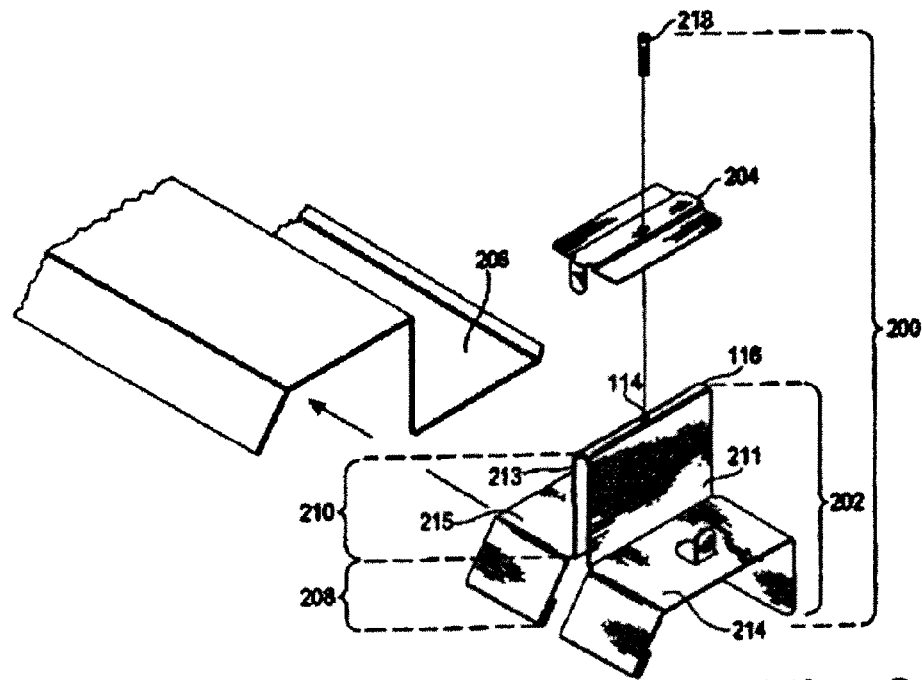
FIG. 3A shows an isometric view of an optimized 'Z' solar panel attachment assembly, in accordance with the present invention.

FIG. 3A shows an isometric view of an optimized 'Z' solar panel attachment assembly. In an advantageous manner, the cost of installing a solar panel may be substantially reduced by the use of purlin framing support members with optimized solar panel attachment assemblies. Here, the purlin framing support member has a 'Z' configuration, or cross-section, although other configurations may be used, such as a "HAT" configuration and a "C" configuration.

A purlin is typically a relatively inexpensive cold-formed horizontal structural member used in building construction. Consequently, an optimized 'Z' solar panel attachment assembly 200 may be used to quickly attach a set of solar panels to an attachment support structure assembled with purlin framing support members 206.

In a common configuration, optimized 'Z' solar panel attachment assembly 200 generally comprises a 'Z' solar panel clip 202 and a solar panel clip washer 204. In general, either or both solar panel clip 202 and solar panel clip washer 204 may be manufactured from any suitably machinable, tooled, or molded material, such as metal (e.g., aluminum, copper, steel, etc.), metal alloy, plastic, ceramic, etc.

Configured to help support the weight of the solar panel, 'Z' solar panel clip 202 is generally designed to properly position and space the solar panel on a purlin framing support member 206. Solar panel clip 202 may itself be divided into a lower purlin attachment section 208 and an upper solar spacing section 210 has gapped-parallel faces 211 and 213 extending vertically from the top surface 116 to perpendicular solar panel clip bearing surfaces 214 and 215, respectively.

Configured to be securely mated onto the 'Z' purlin framing support member, lower purlin attachment section 208 is generally a mirror image of the corresponding purlin surfaces in order to slide the attachment into the purlin. Once secured, solar panel attachment assembly 200 will generally not slide or twist.

Likewise, upper solar panel spacing section 210 is generally designed to properly space proximately positioned solar panels, as well as provide an expansion joint. That is, upper solar panel spacing section 210 provides a structural separation between proximately positioned solar panels, when attached to an attachment support structure, in order to minimize the effect of the stresses and movements of solar panel frame components and to prevent these stresses from splitting or ridging solar panel frame. In one example, proximately positioned solar panels are separated by a width w of the upper solar panel spacing section 210.

In addition, solar panel clip washer 204 may be configured to secure a solar panel onto solar panel clip bearing surface 214. Generally configured to generate a downward compression force on the solar panel frame (not shown), solar panel clip washer 204 may be attached to solar panel clip 202 via a solar panel clip washer fastener 218 inserted through solar panel clip fastener hole 216 (e.g., bolt, screw, stud, clamp, clasp, pin, tie, etc.). Once secured, solar panel clip washer enables a solar panel to be secured against wind uplift and other external forces.

Figure 3B:
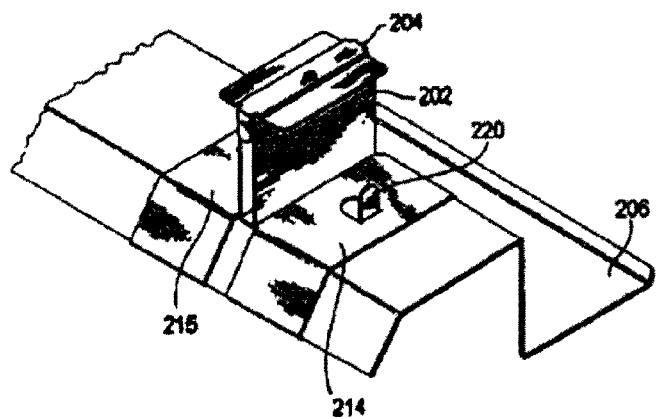
FIG. 3B shows the optimized 'Z' solar panel attachment assembly of FIG. 3A attached to the 'Z' purlin framing support member.

Referring now to FIG. 3B, the isometric view of FIG. 3A is shown in which an optimized 'Z' solar panel attachment assembly is attached to the 'Z' purlin framing support member. In general, once the attachment support structure (not shown) is assembled, generally including an upper purlin framing support member and a lower purlin framing support member, solar panel (not shown) may be installed longitudinally (longest dimension of the solar panel perpendicular to both the upper purlin framing support member and the lower purlin framing support member).

Typically, solar panel clip 202 is positioned and secured on purlin framing support member 206 by a solar panel clip fastener (not shown) generally inserted into the portion of purlin framing support member 206 that is perpendicular to solar panel clip bearing surface 214. In addition, other solar panel clips would be installed on other purlin framing support members as required. Consequently, the solar panel is positioned such that solar panel clip key 220 may inserted through a frame hole in a longitudinal side of the solar panel frame. Once properly positioned, solar panel clip washer 204 may then be installed, consequently allowing solar panel (not shown) to be secured.

Figures 4A, 4B:
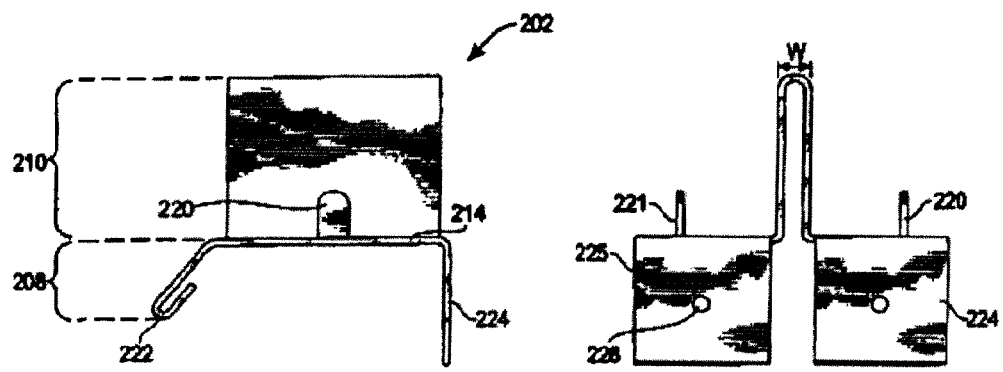
FIG. 4A shows a side view of the 'Z' solar panel clip of FIG. 3A.
FIG. 4B shows a back view of the 'Z' solar panel clip of FIG. 3A.
Figures 4C, 4D:
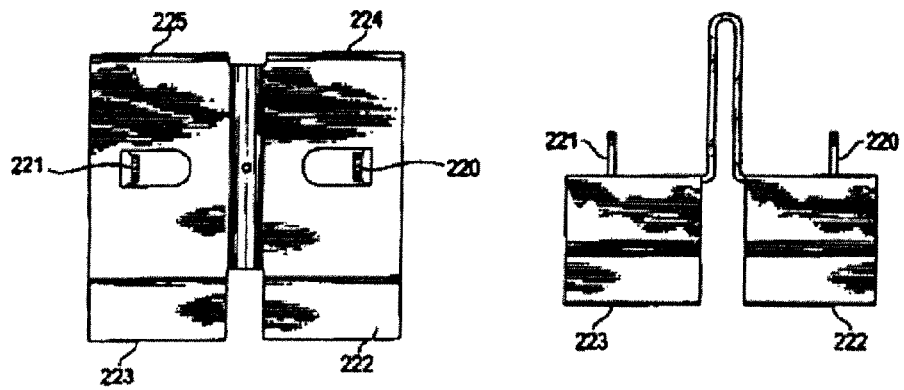
FIG. 4C shows a top-down view of the 'Z' solar panel clip of FIG. 3A.
FIG. 4D shows a front view of the 'Z' solar panel clip of FIG. 3A.

Referring now to FIGS. 4A-D, a set of views of a 'Z' solar panel clip is shown. FIG. 4A shows a side view of the 'Z' solar panel clip. FIG. 4C shows a top-down view of the 'Z' solar panel clip. FIG. 4D shows a front view of the 'Z' solar panel clip.

In general, 'Z' solar panel clip 202 may divided into a 'Z' lower purlin attachment section 208 and a 'Z' upper solar panel spacing section 210. Configured to be securely mated onto the 'Z' purlin framing support member, 'Z' lower purlin attachment section 208 is generally a mirror image of the corresponding purlin surfaces, and further includes 'Z' solar panel clip bearing surface 214 configured to secure the solar panel (not shown) against wind uplift and other external forces.

Attached to 'Z' solar panel clip bearing surface 214 is generally 'Z' solar panel clip bearing surface hem 222 that is configured to slide onto a lip on the 'Z' purlin framing support member. In addition, also attached to 'Z' solar panel clip bearing surface 214 may be a 'Z' solar panel clip perpendicular locking surface 224 which is configured to snugly fit against a corresponding parallel surface of the 'Z' purlin framing support member, as well as provide a 'Z' solar panel clip bore 228 through which solar panel clip fastener may be inserted by which to secure solar panel clip 202 to the 'Z' purlin framing support member. In addition, 'Z' solar panel clip key 220 machined on solar panel clip bearing surface 214 is generally configured to be inserted through a frame hole in a longitudinal side of the solar panel frame.

Likewise, 'Z' solar panel clip bearing surface 215 has or is attached to a hem 223, a solar panel clip perpendicular locking surface 225, and a solar panel clip key 221.

Furthermore, 'Z' upper solar panel spacing section 210 is configured to provide a structural separation between proximately positioned solar panel frame elements, such as the solar panels themselves, in order to minimize the effect of the stresses and movements of solar panel frame components and to prevent these stresses from splitting or ridging solar panel frame.

Figure 5A:
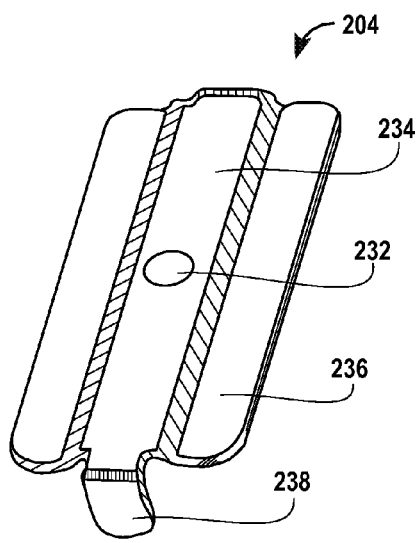
FIG. 5A shows an isometric view of the solar panel clip washer, in accordance with the present invention.
Figure 5B:
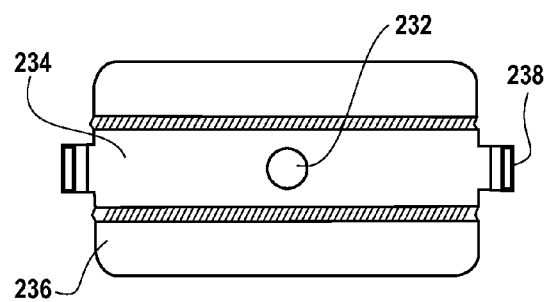
FIG. 5B shows a top-down view of the solar panel clip washer of FIG. 5A.
Figure 5C:
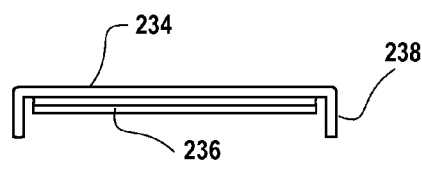
FIG. 5C shows a longitudinal side view of the solar panel clip washer of FIG. 5A.
Figure 5D:
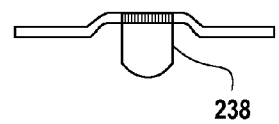
FIG. 5D shows a lateral side view of the solar panel clip washer of FIG. 5A.

Referring now to FIGS. 5A-D, a set of views of the solar panel clip washer of FIG. 3A is shown. FIG. 5A shows an isometric view of the solar panel clip washer. FIG. 5B shows a top-down view of the solar panel clip washer. FIG. 5C shows a longitudinal side view of the solar panel clip washer. FIG. 5D shows a lateral side view of the solar panel clip washer.

Generally configured with a solar panel clip washer guide surface 234 and a set of solar panel clip washer lips 236, solar panel clip washer 204 is further optimized to secure the solar panel (not shown) onto a solar panel clip (not shown).

Solar panel clip washer guide surface generally also includes solar panel clip washer hole 232 configured to accept a solar panel clip washer fastener (not shown) when aligned with a solar panel clip fastener hole (not shown). Further machined onto solar panel clip washer guide surface 234 is generally a set of solar panel clip washer guide arms 238 configured to align solar panel clip washer 204 on the solar panel clip.

Figure 6A:
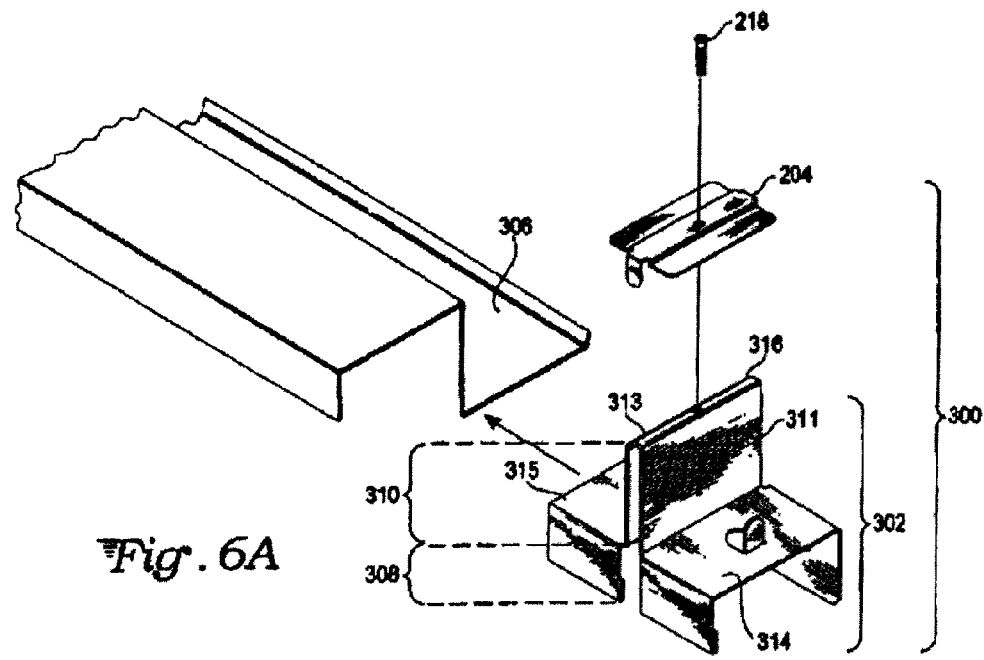
FIG. 6A shows an isometric view of an optimized 'C' solar panel attachment assembly, in accordance with the present invention.

FIG. 6A shows an isometric view of an optimized 'C' solar panel attachment assembly. In an advantageous manner, as previously described, the cost of installing a solar panel may be substantially reduced by the use of purlin framing support members with optimized solar panel attachment assemblies. Here, the purlin framing support member has a 'C' configuration or cross-section.

Optimized 'C' solar panel attachment assembly 300 generally comprises a 'C' solar panel clip 302 and a solar panel clip washer 204. In general, either or both 'C' solar panel clip 302 and solar panel clip washer 204 may be manufactured from any suitably machinable, tooled, or molded material, such as metal (e.g., aluminum, copper, steel, etc.), metal alloy, plastic, ceramic, etc.

Configured to help support the weight of the solar pane, 'C' solar panel clip 302 is generally designed to properly position and space the solar panel on a purlin framing support member 306.

'C' solar panel clip 302 may itself be divided into a 'C' lower purlin attachment section 308 and a 'C' upper solar panel spacing section 310. Upper solar panel spacing section 310 has gapped, parallel faces 311 and 313 extending vertically from a top surface 316 to perpendicular solar panel clip bearing surfaces 314 and 315, respectively.

Configured to be securely mated onto the 'C' purlin framing support member, 'C' lower purlin attachment section 308 is generally a mirror image of the corresponding purlin surfaces in order to slide the attachment into the purlin. Once secured, 'C' solar panel attachment assembly 300 will generally not slide or twist.

Likewise, 'C' upper solar panel spacing section 310 is generally designed to properly space approximately positioned solar panels, as well as provide an expansion joint. That is 'C' upper solar panel spacing section 310 provides a structural separation between proximately positioned solar panels, when attached to an attachment support structure, in order to minimize the effect of the stresses and movements of solar panel frame components and to prevent these stresses from splitting or ridging solar panel frame. In one example, proximately positioned solar panels are separated by a width w of the upper solar panel spacing section 310.

In addition, solar panel clip washer 204 may be configured to secure a solar panel onto 'C' solar panel clip bearing surface 314. Generally configured to generate a downward compression force on the solar panel frame (not shown), solar panel clip washer 204 may be attached to 'C' solar panel clip 302 via 'C' solar panel clip fastener 218 inserted through 'C' solar panel clip fastener hole 316 (e.g., bolt, screw, stud, clamp, clasp, pin, tie, etc.). Once secured, solar panel clip washer 204 enables a solar panel to be secured against wind uplift and other external forces.

Figure 6B:
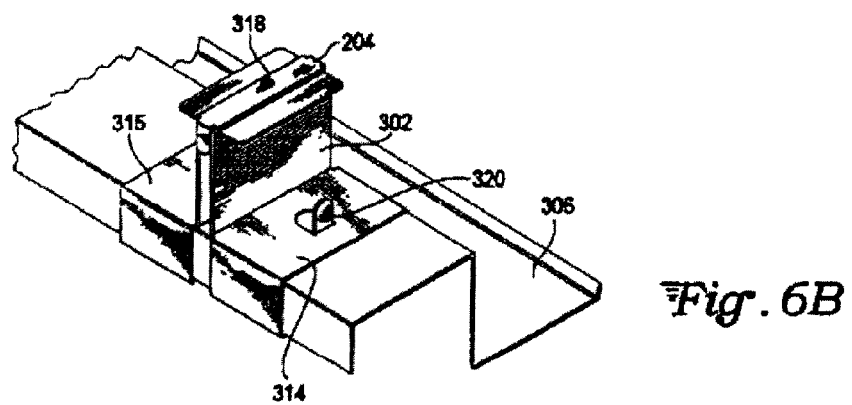
FIG. 6B shows the isometric view of FIG. 3A in which an optimized 'C' solar panel attachment assembly is attached to the 'C' purlin framing support member.

Referring now to FIG. 6B, the isometric view of FIG. 6A is shown in which an optimized 'C' solar panel attachment assembly is attached to the 'C' purlin framing support member. In general, once the attachment support structure (not shown) is assembled, including an upper purlin framing support member and a lower purlin framing support member, a solar panel (not shown) may be installed longitudinally.

Typically, 'C' solar panel clip 302 is positioned and secured on 'C' purlin framing support member 306 by a solar panel clip fastener (not shown) generally inserted into the portion of 'C' purlin framing support member 306 that is perpendicular to 'C' solar panel clip bearing surface 314. In addition, other 'C' solar panel clips would be installed on other purlin framing support members as required. Consequently, the solar panel is positioned such that 'C' solar panel clip key 320 may inserted through a frame hole in a properly positioned, solar panel clip washer 204 may then be installed, consequently allowing solar panel (not shown) to be secured.

Figure 7A:
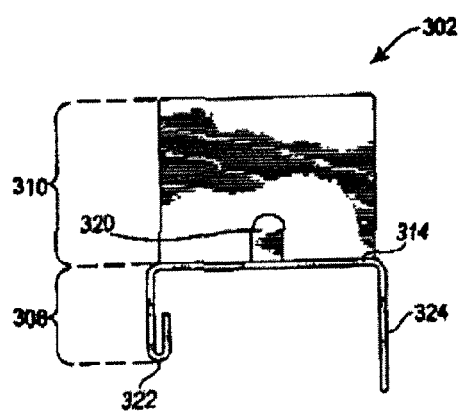
FIG. 7A shows a side view of the 'C' solar panel clip of FIG. 6A.
Figure 7B:
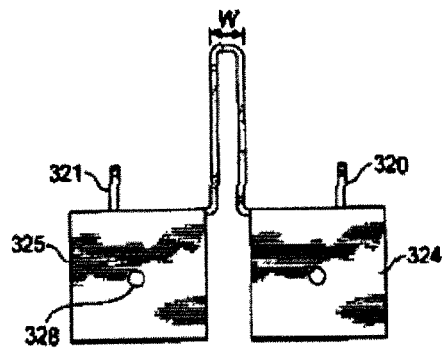
FIG. 7B shows a back view of the 'C' solar panel clip of FIG. 6A.
Figure 7C:
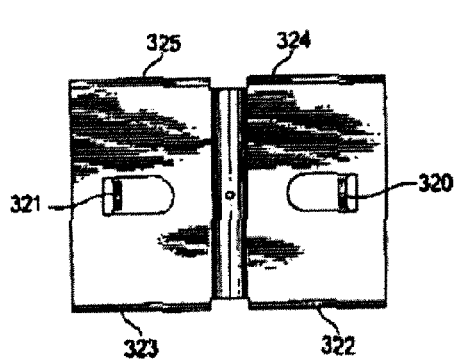
FIG. 7C shows a top-down view of the 'C' solar panel clip of FIG. 6A.
Figure 7D:
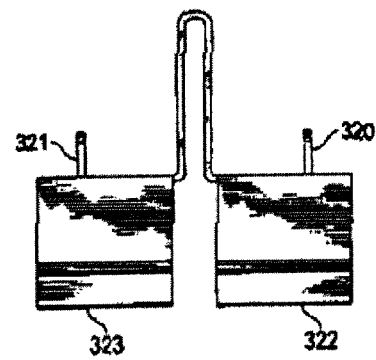
FIG. 7D shows a front view of the 'C' solar panel clip of FIG. 6A.

Referring now to FIGS. 7A-D, a set of views of a 'C' solar panel clip is shown. FIG. 7A shows a side view of the 'C' solar panel clip. FIG. 7B shows a back view of the 'C' solar panel clip. FIG. 7C shows a top-down view of the 'C' solar panel clip. FIG. 7D shows a front view of the 'C' solar panel clip.

In general, 'C' solar panel clip 302 may divided into a 'C' lower purlin attachment section 308 and a 'C' upper solar panel spacing section 210.

In general, 'C' solar panel clip 302 may divided into a 'C' lower purlin attachment section 308 and a 'C' upper solar panel spacing section 310. Configured to be securely mated onto the 'C' purlin framing support member, 'C' lower purlin attachment section 308 is generally a minor image of the corresponding purlin surfaces, and further includes 'C' solar panel clip bearing surface 314 configured to secure the solar panel (not shown) against wind uplift and other external forces.

Attached to 'C' solar panel clip bearing surface 314 is generally 'C' hem 322 that is configured to slide onto a lip on the 'C' purlin framing support member. In addition, also attached to 'C' solar panel clip bearing surface 314 may be a 'C' solar panel clip perpendicular locking surface 324 which is configured to snugly fit against a corresponding parallel surface of the 'C' purlin framing support member, as well as provide a 'C' solar panel clip bore 328 through which a solar panel clip fastener (e.g., bolt, screw, etc.) may be inserted by which to secure solar panel clip 302 to the 'C' purlin framing support member. In addition, 'C' solar panel clip key 320 machined on solar panel clip bearing surface 314 is generally configured to be inserted through a frame hole in a longitudinal side of the solar panel frame.

Likewise, 'C' solar panel clip bearing surface 315 has or is attached to a hem 323, a solar panel clip perpendicular locking surface 325, and a solar panel clip key 321.

In addition, 'C' upper solar panel spacing section 310 is configured to provide a structural separation between proximately positioned solar panel frame elements, such as the solar panels themselves, in order to minimize the effect of the stresses and movements of solar panel frame components and to prevent these stresses from splitting or ridging solar panel frame.

Figure 8A:
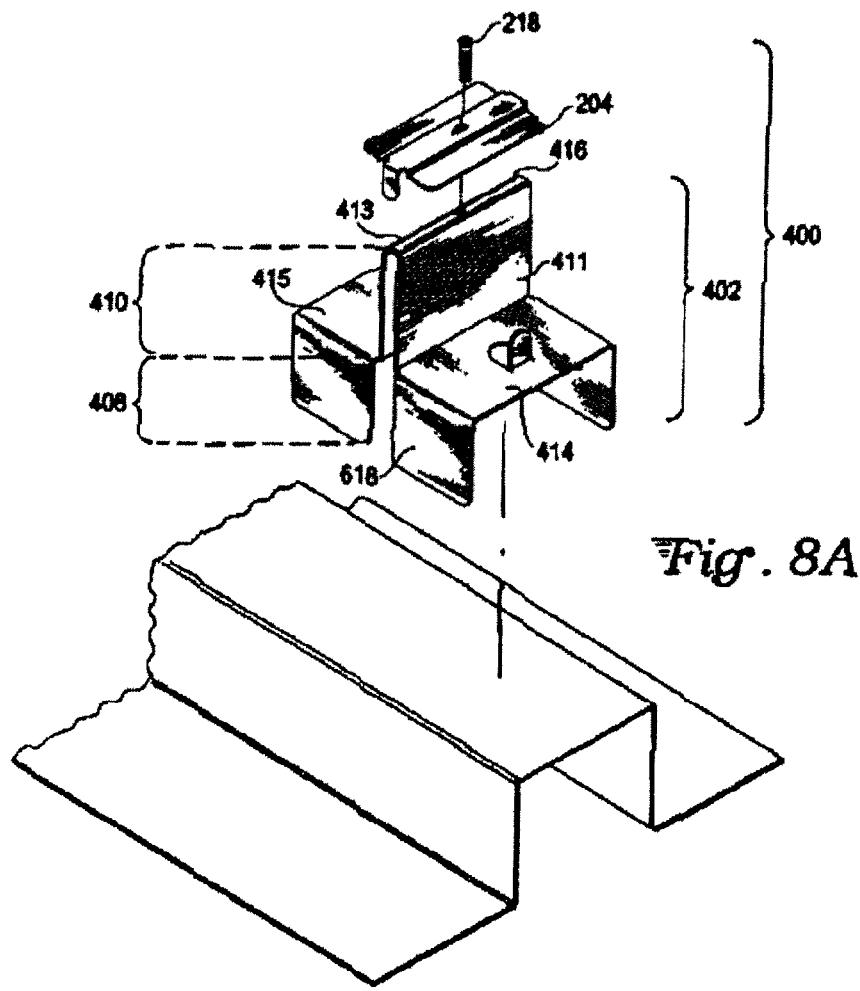
FIG. 8A shows an isometric view of an optimized 'HAT' solar panel attachment assembly, in accordance with the present invention.

FIG. 8A shows an isometric view of an optimized 'HAT' solar panel attachment assembly. In an advantageous manner, as previously described, the cost of installing a solar panel may be substantially reduced by the use of purlin framing support members with optimized solar panel attachment assemblies. Here, the purlin framing support member has a 'HAT' configuration or cross-section.

In a common configuration, optimized 'HAT' solar panel attachment assembly 400 generally comprises a 'HAT' solar panel clip 402 and a solar panel clip washer 204. In general, either/or both solar panel clip 402 and solar panel clip washer 204 may be manufactured from any suitably machinable, tooled, or molded material, such as metal (e.g., aluminum, copper, steel, etc.), metal alloy, plastic, ceramic, etc.

Configured to help support the weight of the solar pane, 'HAT' solar panel clip 402 is generally designed to properly position and space the solar panel on a purlin framing support member 406.

Solar panel clip 402 may itself be divided into a lower purlin attachment section 408 and an upper solar panel spacing section 410. Upper solar panel spacing section 410 has gapped, parallel faces 411 and 413 extending vertically from a top surface 416 to perpendicular solar panel clip bearing surfaces 414 and 415, respectively. Configured to be securely mated onto the 'HAT' purlin framing support member, lower purlin attachment section 408 is generally a minor image of the corresponding purlin surfaces, such that once secured, solar panel attachment assembly 400 will generally not slide or twist.

Likewise, upper solar panel spacing section 410 is generally designed to properly space proximately positioned solar panels, as well as provide an expansion joint. That is, upper solar panel spacing section 410 provides a structural separation between proximately positioned solar panels, when attached to an attachment support structure, in order to minimize the effect of the stresses ad movements of solar panel frame components and to prevent these stresses from splitting or ridging solar panel frame. In one example, proximately positioned solar panels are separated by a width w of the upper solar panel spacing between 410.

In addition, solar panel clip washer 204 may be configured to secure a solar panel onto solar panel clip bearing surface 414. Generally configured to generate a downward compression force on the solar panel frame (not shown), solar panel clip washer 204 may be attached to solar panel clip 402 via solar panel clip fastener hole 416. Once secured, solar panel clip washer enables a solar panel to be secured against wind uplift and other external forces.

Figure 8B:
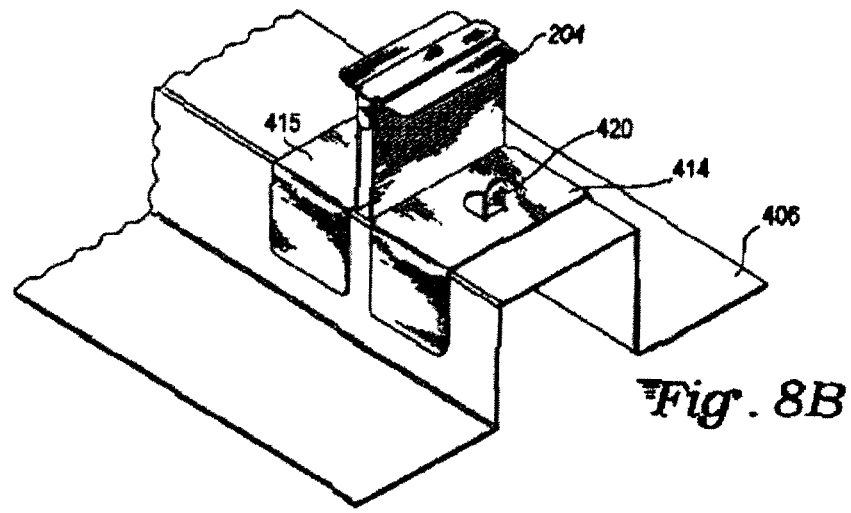
FIG. 8B shows the isometric view of FIG. 8A, in which an optimized 'Hat' solar panel attachment assembly is attached to the 'HAT' purlin framing support member.

Referring now to FIG. 8B, the isometric view of FIG. 8A is shown in which an optimized 'HAT' solar panel attachment assembly is attached to the 'HAT' purlin framing support member. In general, once the attachment support structure (not shown) is assembled, including and upper purlin framing support member and a lower purlin framing support member, a solar panel (not shown) may be installed longitudinally.

Typically, solar panel clip 402 is positioned and secured on purlin framing support member 406 by a solar panel clip fastener (not shown) generally inserted into the portion of purlin framing support member 406 that is perpendicular to solar panel clip bearing surface 414. In addition, other solar panel clips would be installed on other purlin framing support members as required. Consequently, the solar panel is positioned such that 'HAT' solar panel clip key 420 may be inserted through a frame hole in a longitudinal side of the solar panel frame. Once properly positioned, solar panel clip washer 204 may then be installed, consequently allowing solar panel (not shown) to be secured.

Figure 9A:
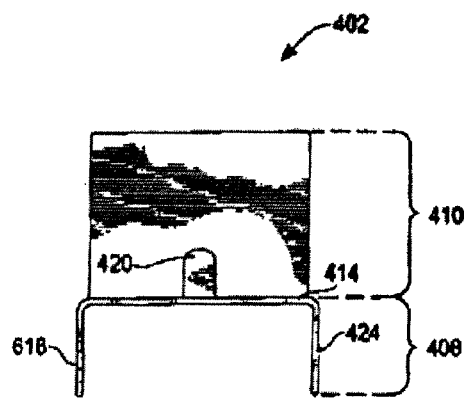
FIG. 9A shows a side view of the 'HAT' solar panel clip of FIG. 8A.
Figure 9B:
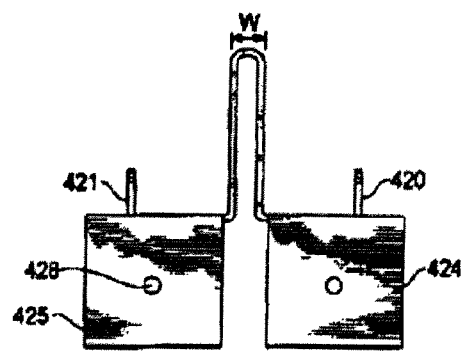
FIG. 9B shows a back view of the 'HAT' solar panel clip of FIG. 8A.
Figure 9C:
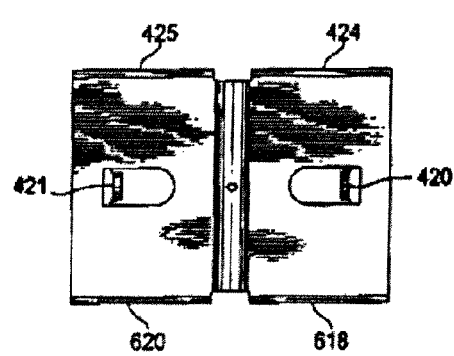
FIG. 9C shows a top-down view of the 'HAT' solar panel clip of FIG. 8A.
Figure 9D:
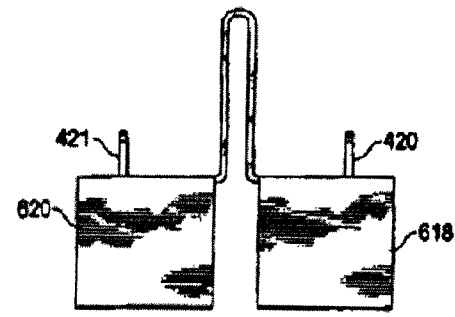
FIG. 9D shows a front view of the 'HAT' solar panel clip of FIG. 8A.

Referring now to FIGS. 9A-D, a set of views of a 'HAT' solar panel clip is shown. FIG. 9A shows a side view of the 'HAT' solar panel clip. FIG. 9B shows a back view of the 'HAT' solar panel clip. FIG. 9C shows a top-down view of the 'HAT' solar panel clip. FIG. 9D shows a front view of the 'HAT' solar panel clip.

In general, 'HAT' solar panel clip 402 may be divided into a 'HAT' lower purlin attachment section 408 and a 'HAT' upper solar panel spacing section 210. Configured to be securely mated onto the 'HAT' purlin framing support member, 'HAT' lower purlin attachment section 408 is generally a mirror image of the corresponding purlin surfaces, and further includes 'HAT' solar panel clip bearing surface 414 that forms the base of 'HAT' lower purlin attachment section 408 is configured to secure the solar panel (not shown) against wind uplift and other external forces.

Further attached to 'HAT' solar panel clip bearing surface 414 may be a 'HAT' solar panel clip perpendicular locking surface 424 which is configured to snugly fit against a corresponding parallel surface of the 'HAT' purlin framing support member, as well as provide a 'Hat' solar panel clip bore 428 through which a solar panel clip fastener may be inserted by which to secure solar panel clip 402 to the 'HAT' purlin framing support member. 'HAT' solar panel clip bearing surface 414 also may be attached to a perpendicular surface 608 that assists in securing and aligning the 'HAT' solar panel clip. In addition, 'HAT' solar panel clip key 420 machined on solar panel clip bearing surface 414 is generally configured to be inserted through a frame hole in a longitudinal side of the solar panel frame.

Likewise, 'HAT' upper solar panel clip bearing surface 415 has or is attached to perpendicular locking surface 425, perpendicular surface 620, and a solar panel clip key 421.

In addition, 'HAT' upper solar panel spacing section 410 is configured to provide a structural separation between proximately positioned solar panel frame elements, such as the solar panels themselves, in order to minimize the effect of the stresses and movements of solar panel frame components and to prevent these stresses from splitting or ridging solar panel frame.

FIG. 10A shows an isometric view of a 'Z' solar panel clip with guide dimples, in accordance with the present invention. The solar clip adds fastener guide dimples 502, 504 to the solar clip of FIGS. 3A-4D. Fastener guide dimples 502, 504 further enhance the connection with the washer by maintaining the washer screw plumb or relatively straight. FIG. 10B shows a top-down view of the solar panel clip of FIG. 10A, and FIG. 10C shows a front view of the 'Z' solar panel clip of FIG. 10A.

FIG. 10D shows a side view of the solar panel clip of FIG. 10A. When the screw that attaches the washer is inserted into the solar clip, the screw fits between dimples 502 and 504, thus aligning the washer with the clip and reinforcing the structure to avoid lateral displacement of the screw. FIG. 10E shows a back view of the 'Z' solar panel clip of FIG. 10A.

Figure 11A:
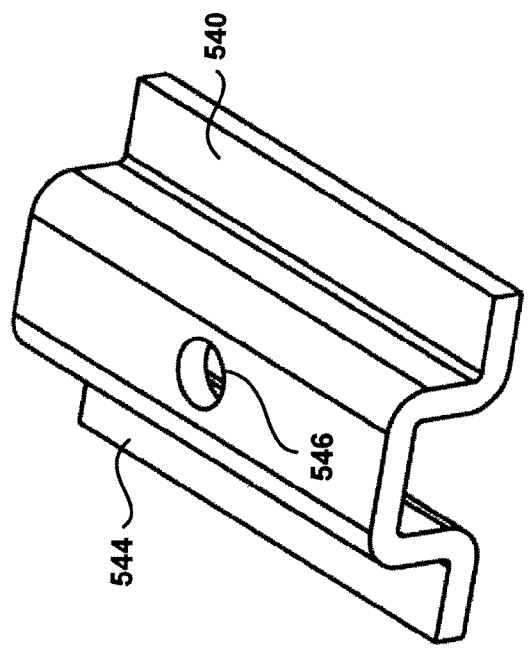
FIG. 11A shows an isometric view of a hat-style solar panel clip washer, in accordance with the present invention.

FIG. 11A shows an isometric view of a hat-style solar panel clip washer, in accordance with the present invention. The hat-style solar panel clip washer is similar to the washer in FIGS. 5A-5D, except for the missing washer guide arms 238 configured to align solar panel clip washer 204 on the solar panel clip. It should be appreciated that the hat-style solar panel clip washer can be used with the solar panel attachment assembly with guide dimples of FIGS. 10A-E. The guide dimples in the attachment assembly enable the alignment of the washer with the attachment, thus the washer guide arms are not required.

Figure 11C:
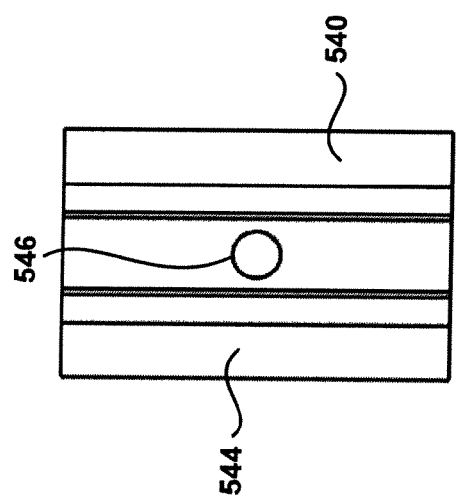
FIG. 11C shows a top-down view of the solar panel clip washer of FIG. 11A.
Figure 11B:
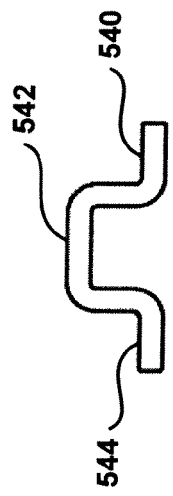
FIG. 11B shows a lateral side view of the solar panel clip washer of FIG. 11A.

The hat-style solar panel clip washer is bi-directional, i.e., the hat-style solar panel clip washer can be inverted to reduce shear factors on the screw. It should be noted that spacing section 210 is shorter to allow hat-style solar panel clip washer to be inverted and have the sides between the solar panels, instead of above the surface of the solar panels. FIG. 11B shows a lateral side view of the hat-style solar panel clip washer of FIG. 11A, and FIG. 11C shows a top-down view of the hat-style solar panel clip washer of FIG. 11A.

FIG. 12A shows an isometric view of a zero-profile 'Z' solar panel clip, in accordance with the present invention. The zero-profile solar clip of FIG. 12A does not have the same upper section of the solar clip shown in FIGS. 3A-4D. The 'Z' solar panel clip of FIG. 12A is used with a washer that has an insert section which is placed between two solar panels. In one embodiment a bottom section of the washer attaches to the zero-profile 'Z' solar panel clip. See for example, the washer shown in FIGS. 13A-C.

The solar panel is positioned such that solar panel clip keys 522, 524 may be inserted through a frame hole in a longitudinal side of the solar panel frame. Solar panel clip keys 526, 528 prevent a washer attached to the clip from sliding sideways. Frame hole 530 is defined for inserting a solar panel fastener (e.g., nuts, bolts, screws, etc.) in order to secure the solar panel. This configuration provides for a lower profile element above the top plane of the solar panels. That is, the only elements rising above the solar panel are the washer lips in one embodiment, as opposed to the whole washer and a top part of the clip rising above the panel when using the clip from FIGS. 3A-4D, as seen below in reference to FIG. 17.

FIG. 12B shows a top-down view of the solar panel clip of FIG. 12A, and FIG. 12C shows a front view of the 'Z' solar panel clip of FIG. 12A. FIG. 12D shows a side view of the solar panel clip of FIG. 12A, and FIG. 12E shows a back view of the 'Z' solar panel clip of FIG. 12A.

Figure 13A:
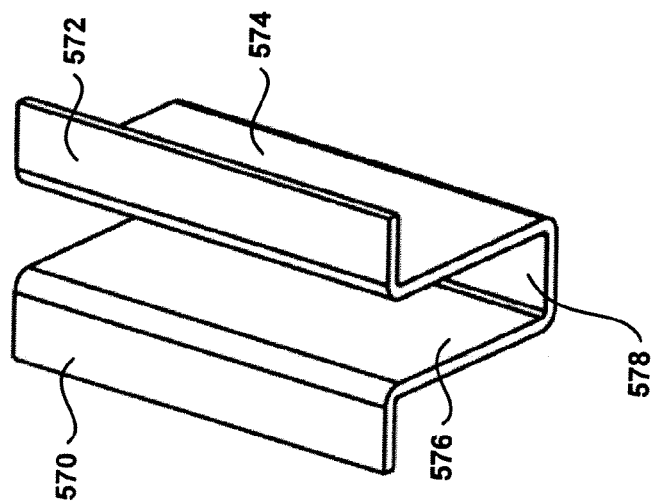
FIG. 13A shows an isometric view of a hat-style zero-profile solar panel clip washer, in accordance with the present invention.
Figure 13C:
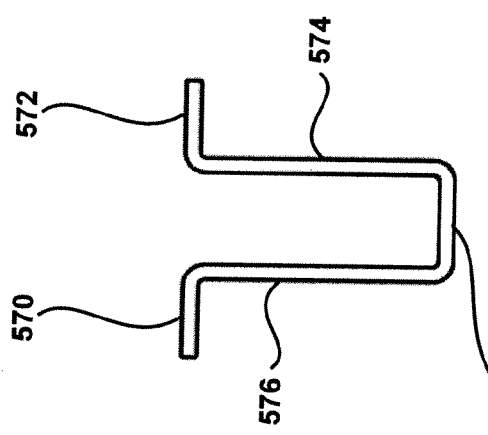
FIG. 13C shows a top-down view of the solar panel clip washer of FIG. 13A.
Figure 13B:
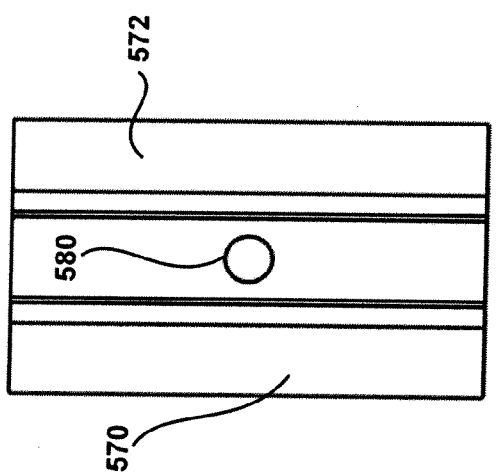
FIG. 13B shows a lateral side view of the solar panel clip washer of FIG. 13A.

FIG. 13A shows an isometric view of a hat-style zero-profile solar panel clip washer, in accordance with the present invention. The hat-style zero-profile solar panel clip washer can be used with the zero-profile 'Z' solar panel attachment assembly from FIGS. 12A-E. During installation, the hat-style zero-profile solar panel clip washer is inserted between two solar panels. The side lips 570, 572 are placed above the solar panel surface and bottom surface 578 is placed against the top surface of the attachment assembly. FIG. 13B shows a lateral side view of the solar panel clip washer of FIG. 13A, and FIG. 13C shows a top-down view of the solar panel clip washer of FIG. 13A.

FIG. 14A shows an isometric view of an end washer, in accordance with the present invention. The end washer is used for holding a single solar panel in place instead of two solar panels. The end washer of FIG. 14A is similar to the washer of FIGS. 11A-C with the exception of a longer side panel 564 placed on the side where a solar panel is not present. The bottom side lip 566 is defined to be placed against the solar panel clip key 220 to form a rigid structure when the clip is attached to the end panel. FIG. 14B shows a lateral side view of the solar panel clip washer of FIG. 14A, and FIG. 14C shows a top-down view of the solar panel clip washer of FIG. 14A.

FIG. 15A shows an isometric view of a zero-profile end washer, in accordance with the present invention. The zero-profile end washer can be assembled with the solar clip from FIGS. 12A-E. The Solar panel clip keys 526, 528 prevent the washer attached to the clip from sliding sideways. FIG. 15B shows a lateral side view of the solar panel clip washer of FIG. 15A, and FIG. 15C shows a top-down view of the solar panel clip washer of FIG. 15A.

Other embodiments change the configuration of the clip to allow for parallel or perpendicular mounting of the solar panels. In one embodiment, the placement of the pins from the solar clip of FIGS. 12A-E is rotated 90° with respect to the center of the surface where the pins are located. In this embodiment, the washer is attached on top of the solar clip to separate adjacent solar panels in the direction parallel to the longitudinal direction of the purlin.

Figure 16:
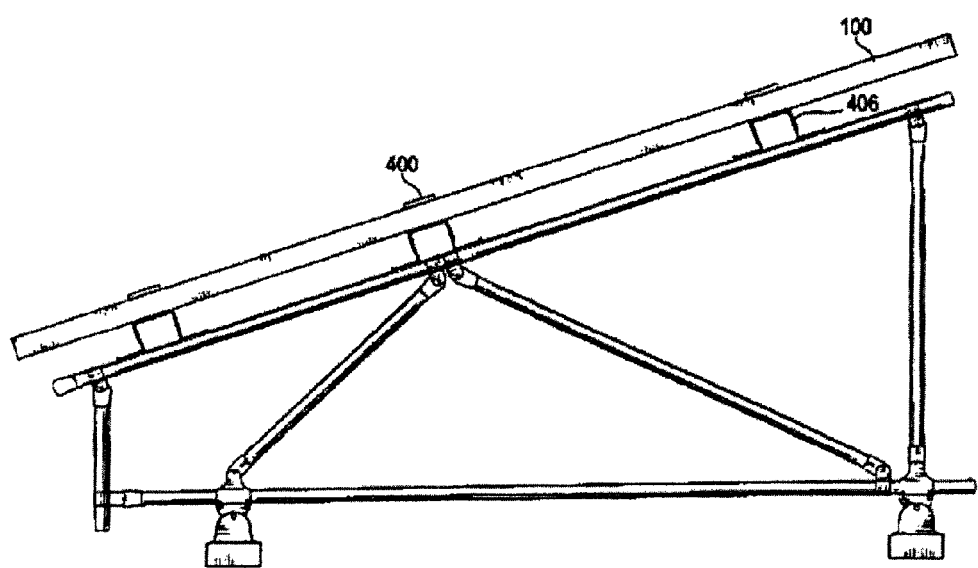
FIG. 16 shows a simplified side diagram of an attachment support structure with a set of purlin framing support members and a set of optimized solar panel attachment assemblies, in accordance with the present invention.
Figure 17:
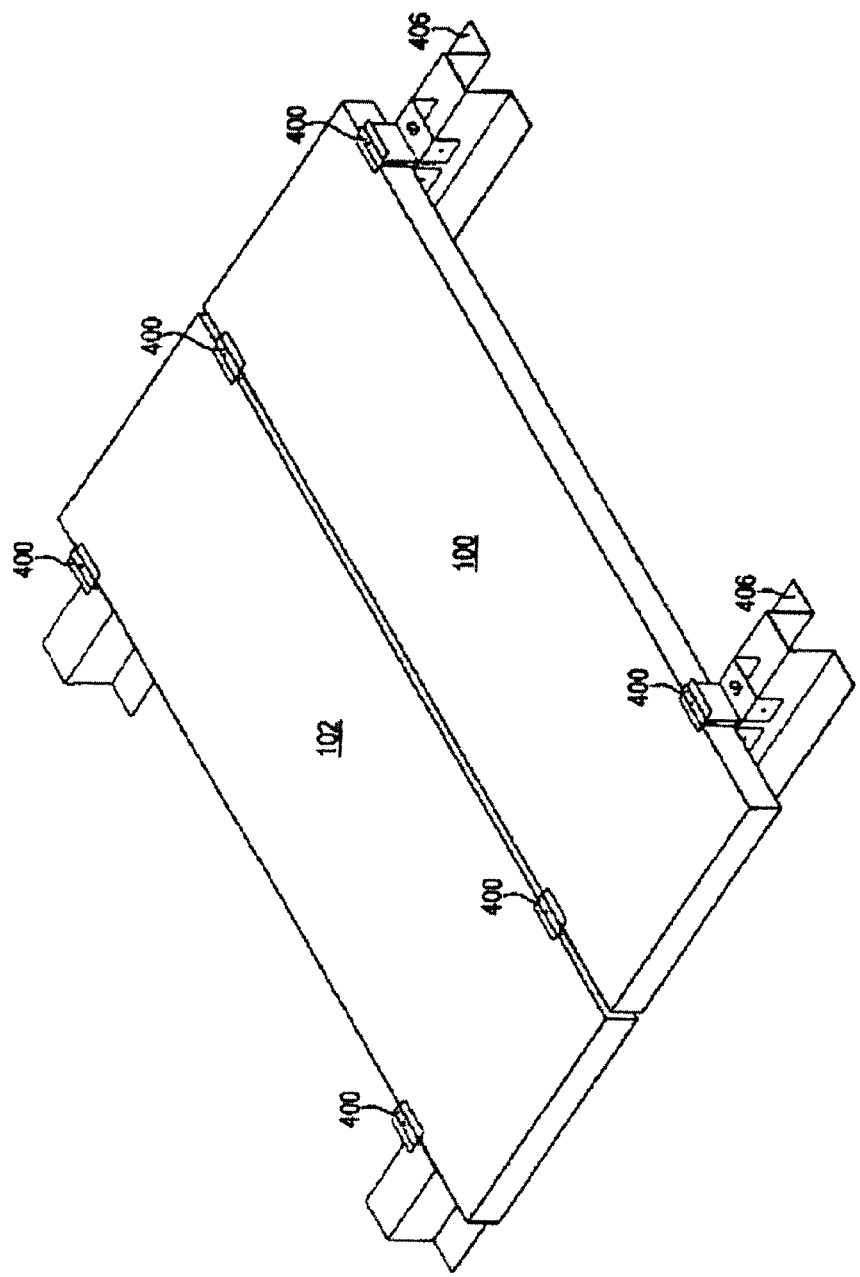
FIG. 17 shows a simplified partial top diagram of FIG. 16 with two solar panels.

Referring now to FIGS. 16 and 17, a simplified side diagram of an attachment support structure is shown with a set of purlin framing support members and a set of optimized solar panel attachment assemblies. As previously described, solar panel 100 is generally positioned from about 5° to about 25° toward the sun in order to maximize sunlight exposure. Here, an optimized 'HAT' solar panel attachment assembly 400 may be used to quickly attach a set of solar panels 100, 102 to an attachment support structure assembled with purlin framing support members 406. Solar panels 101, 102 are spaced apart by a width of an upper solar panel spacing section of each solar panel attachment assembly 400. In one example, all widths of all upper solar panel spacing sections are the same, thus resulting in uniform spacing of solar panels.

Consequently, in an advantageous manner, a solar panel 100 may be quickly installed onto the attachment support structure. For example, a single worker can position and attach optimized 'Z' solar panel attachment assembly 200 on a left or right side of 'Z' purlin framing support member 206. Solar panel 100 is positioned such that a first key (not shown) may be inserted through a frame hole in a first longitudinal side of the solar panel frame. A second optimized 'Z' solar panel attachment assembly 200 may then be quickly positioned and secured on 'Z' purlin framing support member, such that such that a second key (not shown) may also be inserted through a frame hole in a second longitudinal side of the solar panel frame. Once properly positioned, solar panel clip washer (not shown) may then be installed, consequently allowing solar panel 100 to be quickly secured.

Figure 18A:
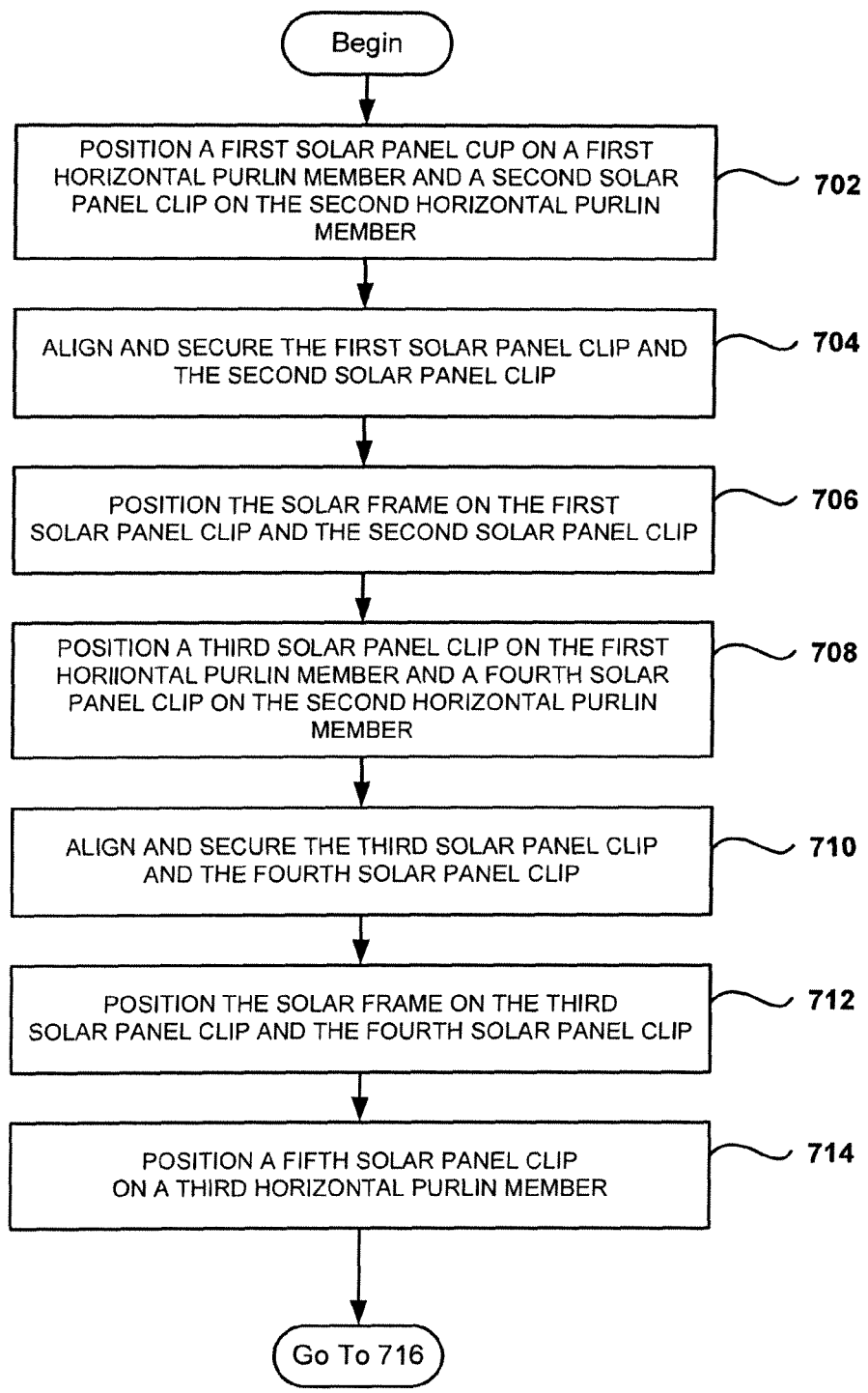
FIGS. 18A and 18B show a simplified method for attaching a solar panel to an attachment support structure with a solar panel clip, in accordance with the present invention.
Figure 18B:
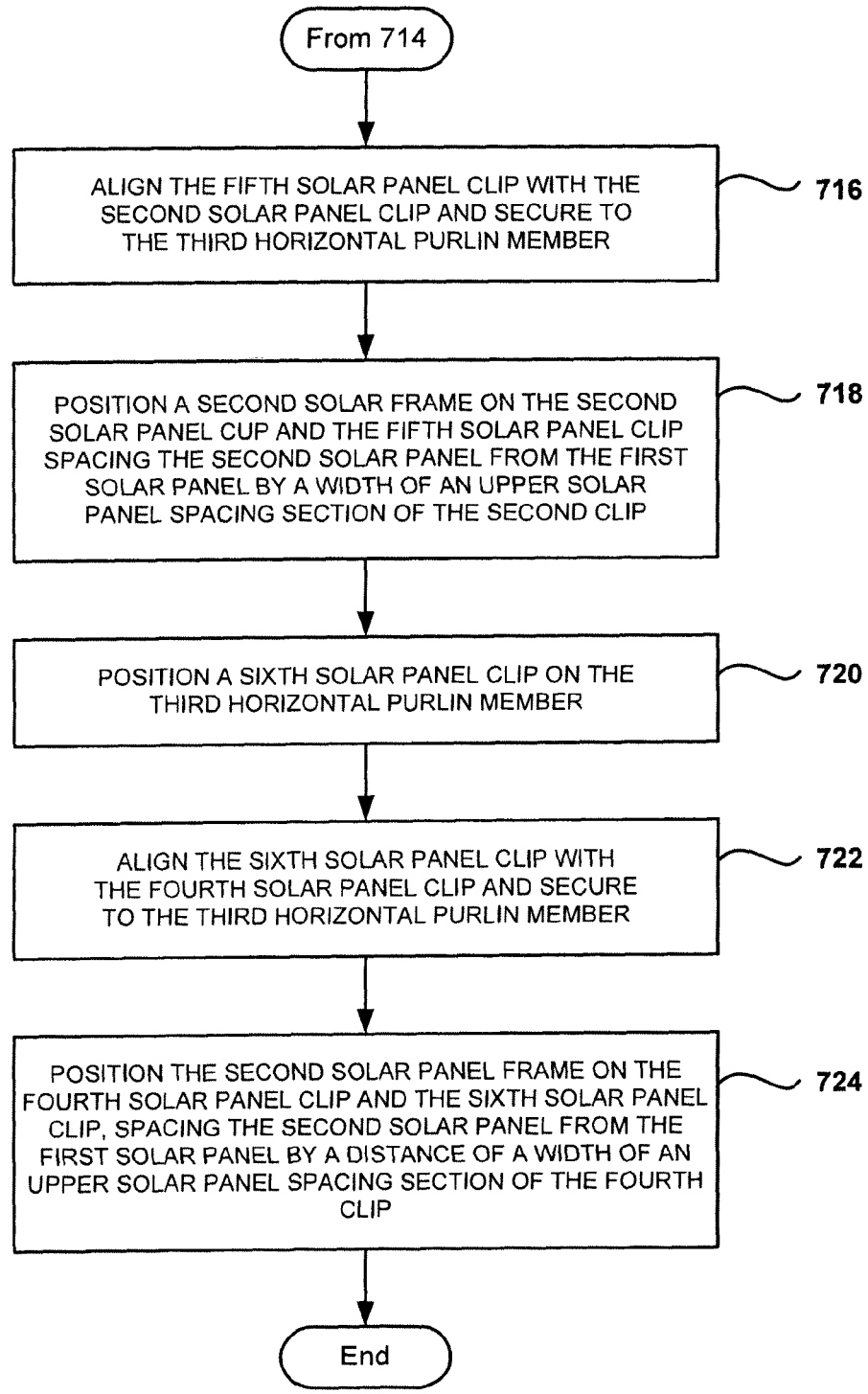

Referring now to FIGS. 18A and 18B, a simplified diagram showing a method for attaching a solar panel to an attachment support structure with a solar panel clip. Initially, at 702, a first solar panel clip is positioned on a first horizontal purlin member and a second solar panel clip is positioned on a second horizontal purlin member.

Next at 704, the first solar panel clip and the second solar panel clip are aligned with each other and secured.

At 706, the solar panel frame is positioned on the first solar panel clip and the second solar panel clip, such that a first key on the first solar panel clip is inserted into a first frame hole, and a first key on the second solar panel clip is inserted into a second frame hole.

At 708, a third solar panel clip is secured on the first horizontal purlin member and a fourth solar panel clip is secured on the second horizontal purlin member.

At 710, the third solar panel clip and the fourth solar panel clip are aligned with each other and secured.

At 712, the solar frame is positioned on the third solar panel clip and the fourth solar panel clip. A first key on the third solar panel clip is inserted into a third frame hole and a first key on the second solar panel clip is interested into a fourth frame hole. If desired, a second solar panel having a second frame may be secured at a position spaced apart from the first solar panel member.

At 714, a fifth solar panel clip is positioned on a third horizontal purlin member.

At 716, the fifth solar panel clip is aligned with the second solar panel clip and is secured to the third horizontal purlin member.

At 718, the second solar panel frame is positioned on the second solar panel clip and the fifth solar panel clip, such that a second key on the second solar panel clip is inserted into a first frame hole of the second solar panel, and a first key on the fifth solar panel clip is inserted into a second frame hole wherein the second solar panel is spaced apart from the first solar panel by a width of an upper solar panel spacing section of the second solar panel clip.

At 720, a sixth solar panel clip is secured on the third horizontal purlin member.

At 722, the sixth solar panel clip is aligned with the fourth solar panel clip and is secured to the third horizontal purlin member.

At 724, the second solar panel frame is positioned on the fourth solar panel clip and the sixth solar panel clip. A second key on said fourth solar panel clip is inserted into a third frame hole of said second solar panel and a first key on said sixth solar panel clip is inserted into a fourth frame hole of said second solar panel. The second solar panel is spaced apart from the first solar panel by a width of an upper solar panel spacing section of the fourth solar panel clip. Thus, the second solar panel is positioned apart from the first solar panel member.

FIG. 19 A is a simplified schematic diagram illustrating a ground support configuration for a solar panel in accordance with one embodiment of the invention. Support 910 is anchored or secured into the ground in one embodiment. At a top end of support 910 is a saddle assembly. In FIG. 19A a first saddle assembly 908a of the complete saddle assembly is visible, and a second saddle assembly sits behind the first saddle assembly 908a. The saddle assembly surrounds the top end of support 910 and is configured to support plate 906. Support extensions 914 are secured to plate 906 and disposed between the two portions of the saddle assembly. The top part of extensions 914 are affixed to plate 906 and the bottom part of extensions 914 are affixed to the first saddle assembly 908a and the second saddle assembly. Plate 906 has a different planar orientation from support extensions 914. One set of extensions 914 has a slot 904 defined therethrough to enable movement of plate 906 around a pivot point. In one embodiment plate 906 is configured to pivot around bolt 902a. Slot 904 is an arc that radially extends from the pivot point, e.g., the pivot point is defined through extension 914, which may also serve as a hole for bolt 902a. Bolts 902a through 902d provide the support for the two portions of the saddle assembly, such that the two portions of the saddle assembly and extensions 914 are affixed through bolts 902a through 902d. Where the pivot point is around bolt 902a, it should be appreciated that a slot may be defined in the other set of extensions 914 to enable movement in the vicinity of bolt 902b. A slot defined in the vicinity of blot 902a is optional where this is the pivot point. Plate 906 includes a plurality of anchors 900a through 900d extending from the top surface of plate 906. In one embodiment, plate 906 and anchors 900a through 900d support an I-beam which will be used for supporting a solar panel. In another embodiment the configuration of the support assembly enables a 15° to 30° angular rotation from a parallel reference plane. However, one skilled in the art will appreciate that more or less angular rotation is possible depending on the application.

Figure 19A:
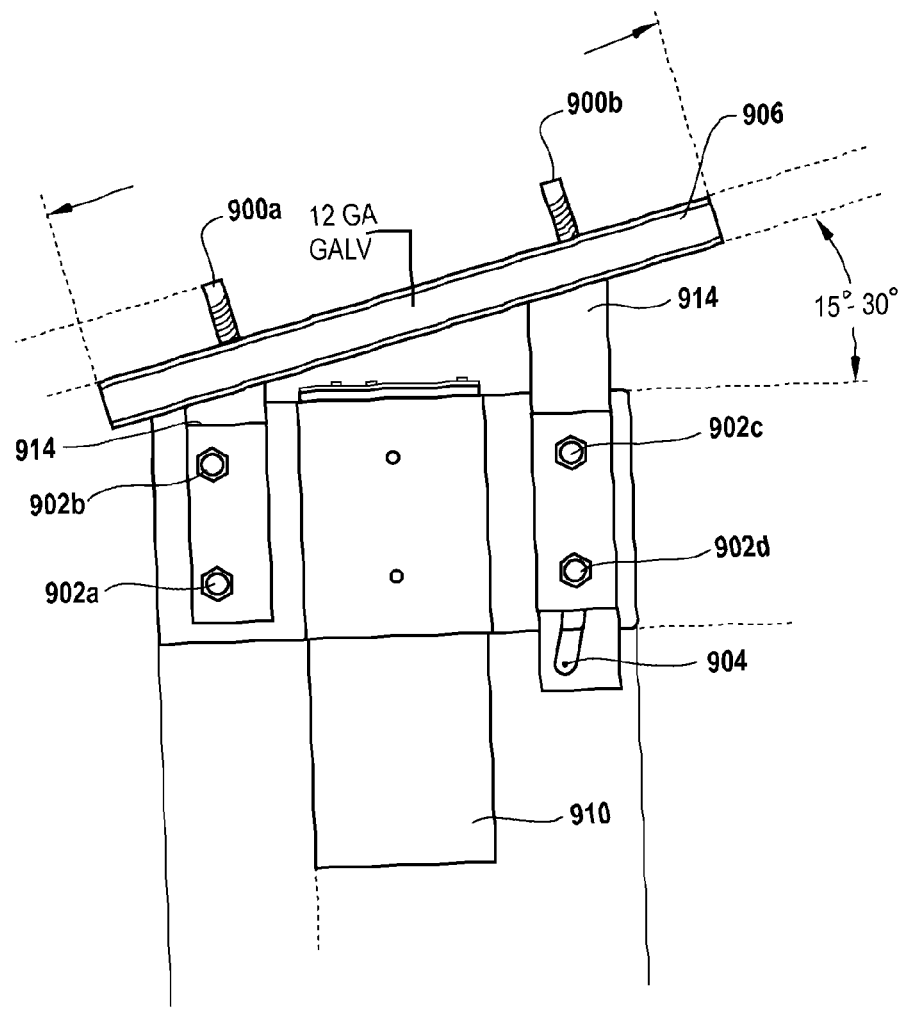
FIG. 19 A is a simplified schematic diagram illustrating a ground support configuration for a solar panel in accordance with one embodiment of the invention.
FIG. 19B. is a simplified schematic diagram illustrating a back view of the support assembly in accordance with one embodiment of the invention.
FIG. 19C. is a simplified schematic diagram illustrating a bottom view of the support assembly in accordance with one embodiment of the invention.
FIG. 19D is a perspective view of the support assembly in accordance with one embodiment of the invention.
Figure 19B:
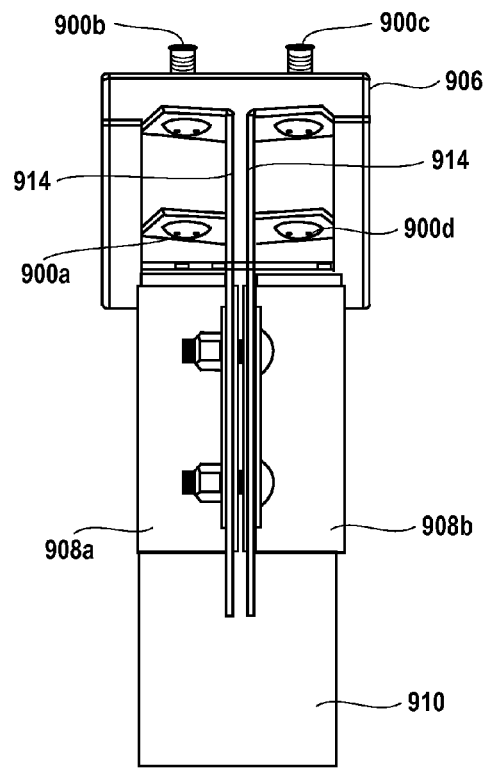

FIG. 19B is a simplified schematic diagram illustrating a back view of the support assembly in accordance with one embodiment of the invention. In FIG. 19B the two portions 908a and 908b of the saddle assembly are illustrated. In addition, the extensions 914 are also illustrated along with the interconnection with the saddle assembly. In one embodiment bolts 900a through 900d are pressed into support plate 906. Accordingly, bolts 900a through 900d function as studs for an I beam to attach to.

Figure 19C:
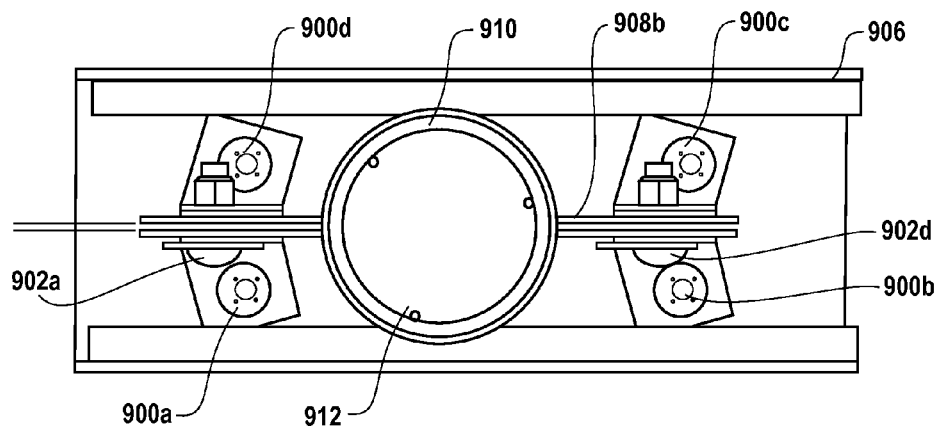

FIG. 19C. is a simplified schematic diagram illustrating a bottom view of the support assembly in accordance with one embodiment of the invention. As illustrated in FIG. 19C saddle assembly portions 908a and 908b are bolted together and support extensions 914, which are fixed to plate 906, are disposed between the saddle assembly portions. Thus, the compression imparted through bolts 902a through 902d provides the rigid support for extensions 914. Bolts 900a through 900d extend through plate 906. As mentioned above, bolts 900a through 900d are pressed into plate 906 in one embodiment in order to provide rigid support for an I-beam and solar panel attached thereto. It should be appreciated that by the adjustment of the bolts 902a through 902d enables movement of support plate 906 to an angle suitable for support of a solar panel. Once the desired angle is achieved, bolts 902a through 902d may be tightened to secure the position of the assembly.

Figure 19D:
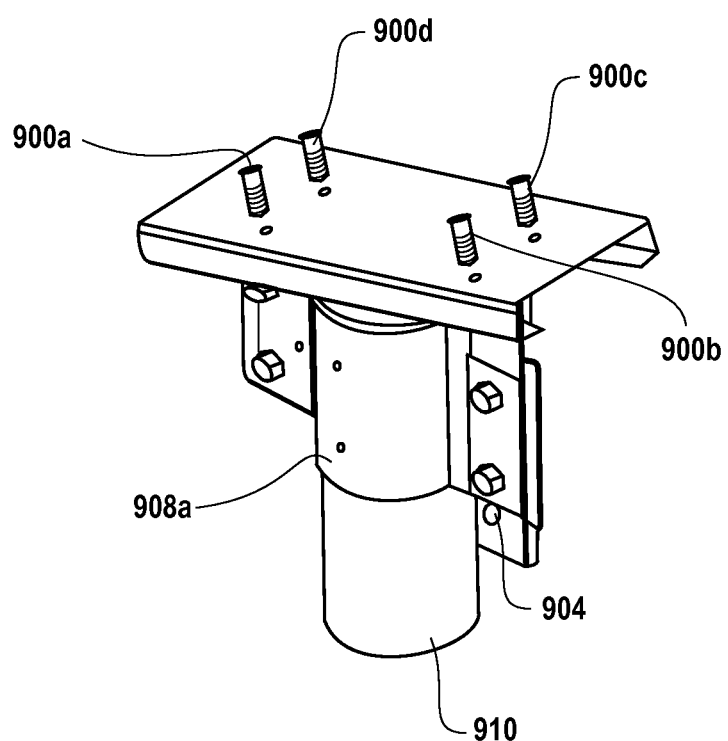

FIG. 19D is a perspective view of the support assembly in accordance with one embodiment of the invention. Support 910 extends from a ground surface. At one and of support 910 is a saddle assembly consisting of two portions 908a and 908b. Support plate 906 is supported through the saddle assembly as described above. Bolts 908a through 908d extend through support plate 906. The angular orientation of support plate 906 is adjusted through the embodiments described above with reference to FIGS. 19A-19C. The material of construction of the components of the support assembly may be any suitable material that can provide the rigid support necessary and withstand the outdoor conditions where the assembly is mounted. In one embodiment, the components are manufactured from galvanized steel.

Advantages of the invention include the ability to quickly attach a solar panel to an attachment support structure in a cost-effective manner.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for securing solar panels to a purlin framing support member, comprising:
 a purlin framing support member having a cross-sectional shape;
 a solar panel clip having a cross-sectional shape that is the same as the cross-sectional shape of said purlin framing support member and being slideable over said purlin framing support member, said solar panel clip further having an upper solar panel spacing section having a washer mount at a top of said upper solar panel spacing section and having first and second parallel, vertical faces extending downwardly from said top, said first and second parallel, vertical faces having a gap therebetween and a pair of dimples extending out from each vertical face towards the gap;
 first and second solar panel bearing platforms, said first solar panel bearing platform extending perpendicularly from a lower edge of said first parallel, vertical face, and said second solar panel bearing platform extending perpendicularly from a lower edge of said second parallel, vertical face;
 a first key extending from said first solar panel bearing platform and a second key extending from said second solar panel bearing platform; and
 a first locking surface extending perpendicularly from said first solar panel bearing platform and a second locking surface extending perpendicularly from said second solar panel bearing platform, wherein said first and second locking surfaces are abuttable against a purlin framing support member surface and each of said first and second locking surfaces include a bore for attachment to the purlin framing support member surface.

2. The system of claim 1 further comprising a first hem extending from said first solar panel bearing platform and a second hem extending from said second solar panel bearing platform.

3. The system of claim 1 wherein said first key is disposed on a central location of said first solar panel bearing platform and said second key is disposed on a central location of said second solar panel bearing platform.

4. A system for securing solar panels to a purlin framing support member, comprising:
- a purlin framing support member having a cross-sectional shape;
- a solar panel clip having a cross-sectional shape that is the same as the cross-sectional shape of said purlin framing support member and being slideable over said purlin framing support member, said clip further having an upper solar panel spacing section having a washer mount at a top of said upper solar panel spacing section and having first and second parallel, vertical faces extending downwardly from said top, said first and second parallel, vertical faces having a gap therebetween;
- first and second solar panel bearing platforms, said first solar panel bearing platform extending perpendicularly from a lower edge of said first parallel, vertical face, and said second solar panel bearing platform extending perpendicularly from a lower edge of said second parallel, vertical face;
- a first key extending from said first solar panel bearing platform and a second key extending from said second solar panel bearing platform; and
- a first locking surface extending perpendicularly from said first solar panel bearing platform and a second locking surface extending perpendicularly from said second solar panel bearing platform, wherein said first and second locking surfaces are abuttable against a purlin framing support member surface and each of said first and second locking surfaces include a bore for attachment to the purlin framing support member surface.

5. The system of claim 4 further comprising a solar panel clip washer.

6. The system of claim 4 wherein said solar panel clip further comprises a first hem extending from said first solar panel bearing platform and a second hem extending from said second solar panel bearing platform, said first and second hems slideable onto a surface of said purlin framing support member.

7. The system of claim 4 wherein said first key is disposed on a central location of said first solar panel bearing platform and said second key is disposed on a central location of said second solar panel bearing platform.

8. A method for attaching a first solar panel to an attachment support structure using a solar panel clip, said first solar panel including a frame having a set of frame holes, said attachment support structure including a first horizontal purlin member and a second horizontal purlin member, the method comprising:
- positioning a first solar panel clip on said first horizontal purlin member and a second solar panel clip on said second horizontal purlin member, wherein said first solar panel clip and said second solar panel clip are aligned and secured;
- positioning said frame of said first solar panel on said first solar panel clip such that a first key on said first solar panel clip is inserted into a first frame hole of said set of frame holes, and a first key on said second solar panel clip is inserted into a second frame hole of said set of frame holes;
- positioning a third solar panel clip on said first horizontal purlin member and a fourth solar panel clip on said second horizontal purlin member, wherein said third solar panel clip and said fourth solar panel clip are aligned and secured;
- positioning said frame of said first solar panel on said third solar panel clip and said fourth solar panel clip such that a first key on said third solar panel clip is inserted into a third frame hole of said set of frame holes, and a first key on said fourth solar panel clip is interested into a fourth frame hole of said set of frame holes;
- positioning a fifth solar panel clip on a third horizontal purlin member;
- aligning said fifth solar panel clip with said second solar panel clip and securing said fifth solar panel clip to said third horizontal purlin member;
- providing a second solar panel including a frame with a set of frame holes;
- positioning said frame of said second solar panel on said second solar panel clip and said fifth solar panel clip such that a second key on said second solar panel clip is inserted into a first frame hole of said set of frame holes of said second solar panel, and a first key on said fifth solar panel clip is inserted into a second frame hole of set of frame holes of said second solar panel, wherein the second solar panel is spaced apart from the first solar panel by a width of an upper solar panel section of the second clip;
- positioning a sixth solar panel clip on a third horizontal purlin member, aligning said sixth solar panel clip with said fourth solar panel clip and securing said sixth solar panel clip to said third horizontal purlin member; and
- positioning said frame of said second solar panel on said fourth solar panel clip and said sixth solar panel clip such that a second key on said fourth solar panel clip is inserted into a third frame hole of said set of frame holes of said second solar panel, and a first key on said sixth solar panel clip is inserted into a fourth frame hole of set of frame holes of second solar panel, wherein the second solar panel is spaced apart from the first solar panel by a width of an upper solar panel spacing section of the fourth clip.

9. The method of claim 8 wherein after positioning said frame on said third solar panel clip and said fourth solar panel clip, attaching a solar panel washer to each of said first solar panel clip, said second solar panel clip, said third solar panel clip, and said fourth solar panel clip.

10. The method of claim 8 wherein the width of the upper solar panel spacing section of the second clip and the width of the upper solar panel spacing section of the fourth clip are the same.

11. The method of claim 8 wherein after positioning said frame on said fourth solar panel clip and said sixth solar panel clip, attaching a solar panel washer to each of said first solar panel clip, said second solar panel clip, said third solar panel clip, said fourth solar panel clip, said fifth solar panel clip, and said sixth solar panel clip.

12. A system for securing solar panels to a purlin framing support member, comprising:
- a purlin framing support member having a cross-sectional shape;
- a washer;
- a clip supporting the washer and adjacent solar panels, the clip including,
  - a first key and a second key extending outwards from a top surface of the clip, the first and second keys mating with bottom surfaces of the adjacent solar panels,
  - a third key and a fourth key extending outwards from the top surface, the third and fourth keys limiting movement of the washer along a gap between the adjacent solar panels, and
  - a bottom surface defined to be slideable over the purlin framing support member;
- the clip having a cross-sectional shape that is the same as the cross-sectional shape of the purlin framing support member and being slideable over the purlin framing support member, the clip further having an upper solar panel spacing section having a washer mount at a top of the upper solar panel spacing section and having first and second parallel, vertical faces extending downwardly from the top, the first and second parallel, vertical faces having a gap therebetween;

first and second solar panel bearing platforms, the first solar panel bearing platform extending perpendicularly from a lower edge of the first parallel, vertical face, and the second solar panel bearing platform extending perpendicularly from a lower edge of the second parallel, vertical face;

the first key extending from the first solar panel bearing platform and the second key extending from the second solar panel bearing platform; and a first locking surface extending perpendicularly from the first solar panel bearing platform and a second locking surface extending perpendicularly from the second solar panel bearing platform, wherein the first and second locking surfaces are abuttable against a purlin framing support member surface and each of the first and second locking surfaces include a bore for attachment to the purlin framing support member surface.

13. The system of claim 12, wherein the washer includes,
a bottom side disposed over the top surface of the clip between the third and fourth keys,
two vertical faces extending in parallel and upwards from the bottom side of the washer, the two vertical faces abutting a side surface of corresponding adjacent solar panels, and
a lip extending from a top of each of the two vertical faces, each lip disposed over a top surface of corresponding adjacent solar panels.

14. The system of claim 12, wherein the bottom surface of the clip includes multiple extensions configured to mate with multiple surfaces of the purlin framing support member.

15. The assembly system of claim 14, wherein one of the multiple extensions of the bottom surface of the clip includes a bearing surface hem.

\* \* \* \* \*